US010541638B2

(12) United States Patent
Shouji et al.

(10) Patent No.: US 10,541,638 B2
(45) Date of Patent: Jan. 21, 2020

(54) CONTROL APPARATUS AND CONTROL METHOD

(71) Applicant: NISSAN MOTOR CO., LTD., Yokohama-shi, Kanagawa (JP)

(72) Inventors: Mitsuhiro Shouji, Kanagawa (JP); Hiromichi Kawamura, Kanagawa (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 15/567,659

(22) PCT Filed: Apr. 20, 2015

(86) PCT No.: PCT/JP2015/062017
§ 371 (c)(1),
(2) Date: Oct. 19, 2017

(87) PCT Pub. No.: WO2016/170585
PCT Pub. Date: Oct. 27, 2016

(65) Prior Publication Data
US 2018/0159458 A1 Jun. 7, 2018

(51) Int. Cl.
H02P 27/12 (2006.01)
H02P 27/08 (2006.01)
(Continued)

(52) U.S. Cl.
CPC ............ H02P 27/12 (2013.01); H02P 21/18 (2016.02); H02P 21/22 (2016.02); H02P 27/08 (2013.01); B62D 5/0463 (2013.01)

(58) Field of Classification Search
CPC ....... B62D 5/0463; H02P 27/12; H02P 21/18; H02P 21/22; H02P 27/08
(Continued)

(56) References Cited

U.S. PATENT DOCUMENTS 5,917,721 A 6/1999 Kerkman et al.
8,829,829 B2 9/2014 Yoneshima et al.
(Continued)

FOREIGN PATENT DOCUMENTS

JP 2014-155408 A 6/2004
JP 2007-159185 A 6/2007
(Continued)

Primary Examiner — Bickey Dhakal
Assistant Examiner — Zemenay T Truneh
(74) Attorney, Agent, or Firm — Foley & Lardner LLP

(57) ABSTRACT

A control apparatus for controlling an electrical unit driven by AC power, the control apparatus comprising a pair of switching elements configured to convert power from a power source into AC power and supply the AC power to the electrical unit. The control apparatus comprises the steps of generating a PWM signal on the basis of the duty command value calculated by the calculation unit and a carrier signal for performing the PWM control; controlling the AC power supplied to the electrical unit by switching a connection state of the switching element on the basis of the PWM signal generated by the generating unit; determining whether the carrier signal increases or decreases; and adjusting a switching timing of the switching element by correcting the duty command value calculated by the calculation unit on the basis of whether the carrier signal is increasing or decreasing determined by the determination unit.

10 Claims, 12 Drawing Sheets

(51) Int. Cl.
*H02P 21/18* (2016.01)
*H02P 21/22* (2016.01)
*B62D 5/04* (2006.01)

(58) Field of Classification Search
USPC .............................................. 318/400.02, 14
See application file for complete search history.

(56) References Cited

U.S. PATENT DOCUMENTS

| | | |
|---|---|---|
| 9,059,657 B2 | 6/2015 | Maekawa |
| 2012/0206077 A1 | 8/2012 | Yoneshima et al. |
| 2013/0305760 A1 | 11/2013 | Shinomoto et al. |
| 2014/0077738 A1* | 3/2014 | Iwaji ....................... H02P 27/08 |
| | | 318/400.36 |
| 2014/0103844 A1* | 4/2014 | Omata ....................... H02P 6/10 |
| | | 318/400.23 |
| 2015/0077025 A1* | 3/2015 | Suzuki ................ B62D 5/0463 |
| | | 318/400.02 |
| 2017/0063253 A1* | 3/2017 | Fukumaru ............... H02P 21/13 |

FOREIGN PATENT DOCUMENTS

| | | |
|---|---|---|
| JP | 2012-170210 A | 9/2012 |
| WO | WO 2012/107987 A1 | 8/2012 |

* cited by examiner

CONTROL APPARATUS AND CONTROL METHOD

TECHNICAL FIELD

The present invention relates to a control apparatus and a control method for controlling AC power supplied to an electrical load.

BACKGROUND ART

As a control apparatus for controlling an electric load such as a motor, there is known an apparatus that performs analog-to-digital (A/D) conversion for an AC current of a motor at the timing when a carrier signal used by a pulse width modulation (PWM) control is at a peak and a valley, and calculates a duty command value on the basis of the converted current data.

In such a control apparatus, in order to prevent a pair of semiconductor devices arranged in the same phase from being simultaneously turned on when generating a PWM signal in response to a duty command value, a delay time called a "dead time" is provided in the PWM signal. In addition, a center timing of an ON period of the PWM signal provided with the dead time is deviated from an A/D conversion timing executed in a peak and a valley of the carrier signal, and a sampling error is included as a noise in the current data subjected to the A/D conversion.

In this regard, JP2007-159185A discusses a technique of matching the A/D conversion timing with the center timing of the ON period of the PWM signal by shifting the A/D conversion timing by a half of a predetermined dead time from the peak or the valley of the carrier signal.

SUMMARY OF INVENTION

However, in the aforementioned technique, the A/D conversion timing is uniformly shifted by a predetermined time regardless of a duty ratio of the PWM signal. Therefore, the A/D conversion timing and the center timing of the ON period of the PWM signal may be deviated from each other in some cases.

For example, in a control apparatus in which the dead time is shortened as the duty ratio increases in the vicinity of a duty ratio of 100%, the A/D conversion timing is uniformly shifted in spite of a fact that a period of the dead time changes depending on the duty ratio. In this configuration, when the duty ratio is at 100%, the dead time is not provided in the PWM signal. Therefore, in particular, a deviation between the A/D conversion timing and the center timing of the ON period of the PWM signal increases. As a result, the sampled current data has a waveform in which a sinusoidal wave is collapsed. Therefore, a harmonic noise component Is mixed in the current data.

In this manner, if the A/D conversion timing is uniformly shifted by a half of the dead time, a deviation is generated between the A/D conversion timing and the center timing of the ON period of the PWM signal, so that a sampling noise may be mixed in the detection signal of the AC current in some cases.

In view of the aforementioned problems, it is therefore an object of the present invention to provide a control apparatus and a control method capable of suppressing degradation of detection accuracy of AC current supplied to an electrical load.

A control apparatus for controlling an electrical unit driven by AC power, the control apparatus comprises a pair of switching elements configured to convert power from a power source into AC power and supply the AC power to the electrical unit. The control apparatus comprises a conversion unit configured to obtain a current or voltage signal supplied to the electrical unit and convert the signal from an analog format to a digital format. The control apparatus further comprises a calculation unit configured to calculate a duty command value for performing a pulse width modulation (PWM) control for the electrical unit on the basis of the signal converted by the conversion unit; a generating unit configured to generate a PWM signal on t e basis of the duty command value calculated by the calculation unit and a carrier signal for performing the PWM control and a control unit configured to control the AC power supplied to the electrical unit by switching a connection state of the switching element on the basis of the PWM signal generated by the generating unit. The control apparatus comprises a determination unit configured to determine whether the carrier signal increases or decreases; and a correction unit configured to adjust a switching timing of the switching element by correcting the duty command value calculated by the calculation unit on the basis of whether the carrier signal is increasing or decreasing determined by the determination unit.

DESCRIPTION OF EMBODIMENTS

Embodiments of the present invention will now be described with reference to the accompanying drawings.

<First Embodiment>

Figure 1:
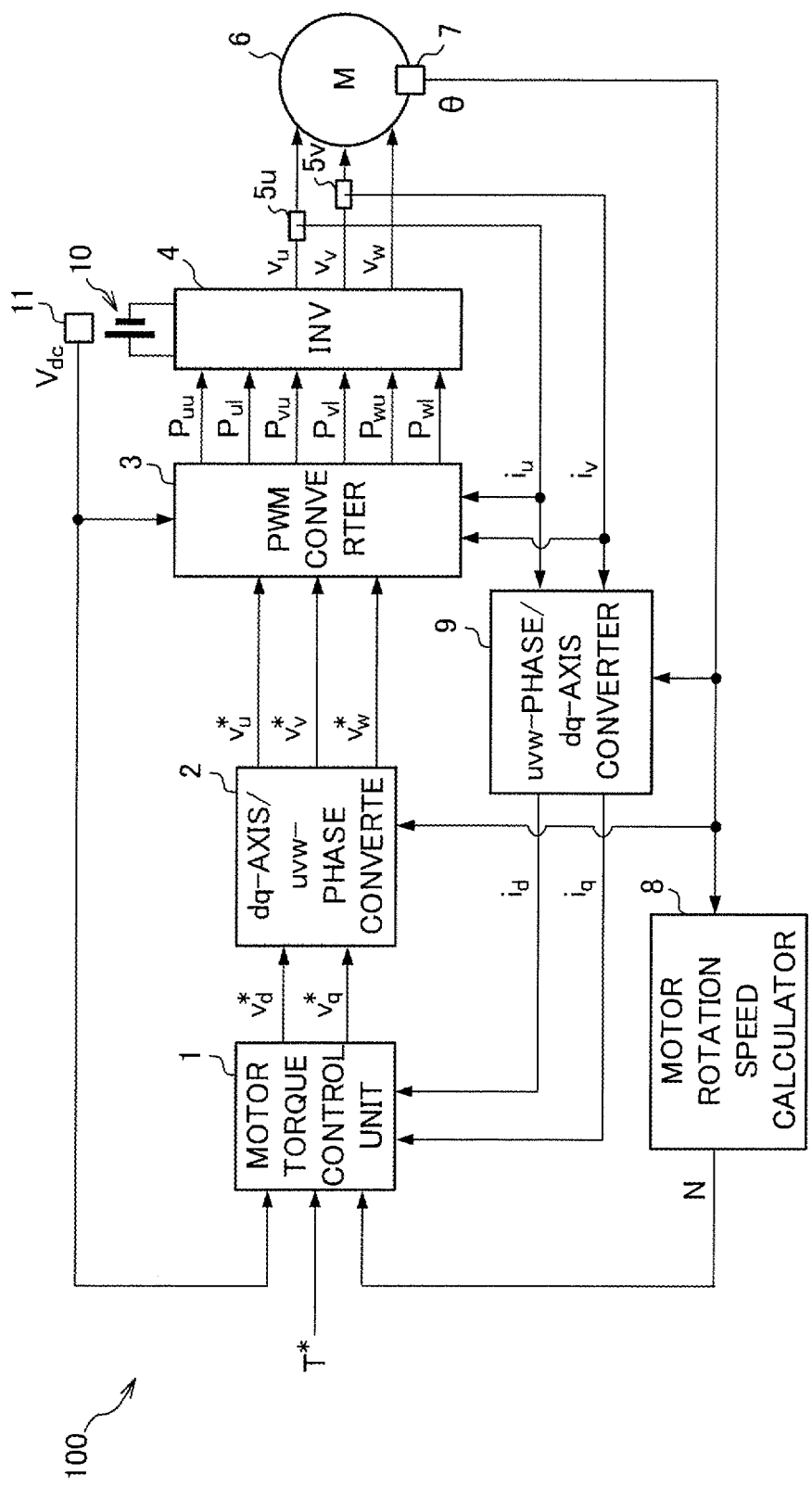
FIG. 1 is a diagram illustrating an exemplary configuration of a control apparatus for controlling an electric motor apparatus according to a first embodiment of the invention.

FIG. 1 is a diagram illustrating an exemplary configuration of a control apparatus according to a first embodiment of the invention.

The control apparatus 100 is a motor control apparatus for driving the motor 6. The control apparatus 100 is mounted on, for example, a hybrid vehicle, an electric vehicle, or the like. According to this embodiment, the control apparatus 100 executes a vector control to control AC power supplied to the motor 6.

The control apparatus 100 includes a motor torque control unit 1, a dq-axis/uvw-phase converter 2, a pulse width modulation (PWM) converter 3, an inverter (INV) 4, and current detectors 5u and 5v. The control apparatus 100 includes a rotor position detector 7, a motor rotation speed calculator 8, a uvw-phase/dq-axis converter 9, a battery 10, and a battery voltage detector 11.

The motor 6 is an electrical unit driven by AC power. As the motor 6, an electrical load such as a driving motor or a steering motor is used. The motor 6 is a poly-phase AC motor driven by three-phase AC currents including U-phase, V-phase, and W-phase currents in this embodiment. The motor 6 is provided with the rotor position detector 7.

The rotor position detector 7 detects a position of the rotor of the motor 6 at a predetermined cycle. The rotor position detector 7 is, for example, a resolver. The rotor position detector 7 outputs a detection signal representing an electrical angle θ of the rotor to the dq-axis/uvw-phase converter 2, the motor rotation speed calculator 8, and the uvw-phase/dq-axis converter 9 on the basis of the detection result.

The motor rotation speed calculator 8 is provided with a conversion unit that obtains a detection signal from the rotor position detector 7, performs A/D conversion for the detection signal from an analog format to a digital format, and outputs the electrical angle detection value θ. The motor rotation speed calculator 8 calculates a difference between the present electrical angle detection value θ and the previous electrical angle detection value, that is, a change amount of the electrical angle detection value per unit time, on the basis of the electrical angle detection value θ subjected to the A/D conversion. The motor rotation speed calculator 8 calculates a rotation speed N of the motor 6 from the change amount of the electrical angle detection value and outputs the rotation speed N to the motor torque control unit 1.

The battery 10 is a power source for supplying power to the motor 6 through the inverter 4. The battery 10 outputs DC power to the inverter 4. The battery 10 is, for example, a lithium ion battery.

The battery voltage detector 11 detects a voltage of the battery 10. The battery voltage detector 11 outputs a battery voltage detection value $V_{dc}$ representing the detected voltage to the motor torque control unit 1.

The motor torque control unit 1 obtains a torque command value T* that determines a driving force of the motor 6 from a controller (not shown). The controller (not shown) calculates a torque command value T* depending on a vehicle driving state. For example, as an accelerator pedal depression level of a vehicle increases, the torque command value T* output to the motor torque control unit 1 increases.

The motor torque control unit 1 calculates the d-axis voltage command value $v_d^*$ and the q-axis voltage command value $v_q^*$ on the basis of the torque command value T*. The d-axis current detection value $i_d$ and the q-axis current detection value $i_q$ are obtained by converting detection values of the three-phase AC currents supplied to the motor 6 into dq-axis coordinates.

According to this embodiment, the motor torque control unit 1 calculates the d-axis current command value and the q-axis current command value on the basis of the torque command value T*, the battery voltage detection value $V_{dc}$, the d-axis current detection value $i_d$, and the q-axis current detection value $i_q$. The motor torque control unit 1 calculates the d-axis voltage command value $v_d^*$ and the q-axis voltage command value $v_q^*$ by executing the current vector control operation on the basis of the calculated d-axis current command value and the calculated q-axis current command value. The motor torque control unit 1 outputs the calculated d-axis voltage command value $v_d^*$ and the calculated q-axis voltage command value $v_q^*$ to the dq-axis/uvw-phase converter 2.

The dq-axis/uvw-phase converter 2 converts the d-axis voltage command value $v_d^*$ and the q-axis voltage command value $v_q^*$ into the three-phase voltage command value including the U-phase voltage command value $v_u^*$, the V-phase voltage command value $v_v^*$, and the W-phase voltage command value $v_w^*$ using the following Equation (1) on the basis of the electrical angle detection value θ from the rotor position detector 7.

[Equation 1]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^* \\ v_q^* \end{bmatrix} \quad (1)$$

The dq-axis/uvw-phase converter 2 outputs the three-phase voltage command values $v_u^*$, $v_v^*$, and $v_w^*$ to the PWM converter 3.

The PWM converter 3 controls the AC power supplied to each phase of the motor 6 from the inverter 4 by executing pulse width modulation (PWM) on the basis of the three-phase voltage command values $v_u^*$, $v_v^*$, and $v_w^*$. That is, the PWM converter 3 performs PWM control for the power supplied to each phase of the motor 6 from the battery 10.

According to this embodiment, the PWM converter 3 generates each PWM signal for driving each of a pair of switching elements provided for each phase of the motor 6 on the basis of the three-phase voltage command values $v_u^*$, $v_v^*$, and $v_w^*$ and the battery voltage detection value $V_{dc}$.

In addition, the PWM converter 3 adds a dead time to each PWM signal supplied to each of a pair of switching elements in order to prevent a pair of the switching elements from being conducted simultaneously. The PWM converter 3 outputs the PWM signal obtained by adding the dead time to the inverter 4 as a driving signal of the switching element.

For example, the PWM converter 3 calculates a duty command value for determining a pulse width of the voltage supplied to the U-phase on the basis of the U-phase voltage command value $v_u^*$ and the battery voltage detection value $V_{dc}$. The PWM converter 3 generates each PWM signal to a pair of switching elements corresponding to the U-phase on the basis of the calculated U-phase duty command value and the calculated carrier signal. The PWM converter 3 outputs each driving signal $P_{uu}$ and $P_{ul}$ obtained by adding the dead time to each pulse of the PWM signal to control terminals of a pair of switching elements.

The PWM converter 3 outputs driving signals $P_{uu}$ and $P_{ul}$ to each control terminal of a pair of switching elements corresponding to the U-phase and outputs driving signals $P_{vu}$ and $P_{v1}$ to each control terminal of a pair of switching elements corresponding to the V-phase. In addition, the PWM converter 3 outputs driving signals $P_{wu}$ and $P_{w1}$ to each control terminal of a pair of switching elements corresponding to the W-phase of the motor 6.

The inverter 4 controls AC power supplied to each phase of the motor 6 by switching a connection state (ON/OFF) of a pair of switching elements of each phase on the basis of the driving signals $P_{uu}$, $P_{u1}$, $P_{vu}$, $P_{v1}$, $P_{wu}$, and $P_{w1}$ generated from the PWM converter 3.

The inverter 4 has a pair of switching elements connected in parallel with the battery 10 for each phase of the motor 6. A pair of switching elements constitute a switching circuit in which two semiconductor devices are connected in series. In the following description, the switching element connected between a positive terminal of the battery 10 and a power terminal of the motor 6 will be referred to as an "upper stage switching element," and a switching element connected between the power terminal of the motor 6 and a negative terminal of the battery 10 will be referred to as a "lower stage switching element."

The upper stage switching element supplies an electric potential $+V_{dc}/2$ generated in the positive terminal of the battery 10 in a conducted state (ON) and stops supply of the electric potential in a non-conducted state (OFF). Meanwhile, the lower stage switching element supplies the electric potential $-V_{dc}/2$ generated in the negative terminal of the battery 10 to the motor 6 in a conducted state and stops supply of the electric potential to the motor 6 in a non-conducted state.

As the switching element, for example, a power element such as a field effect transistor (FET) is employed. The switching element can be switched to ON or OFF in response to a pulse supplied to its control terminal (for example, gate terminal).

The inverter 4 converts the DC voltage $V_{dc}$ of the battery 10 to three-phase PWM voltages $v_u$, $v_v$, and $v_w$ on the basis of driving signals $P_{uu}$, $P_{u1}$, $P_{vu}$, $P_{v1}$, $P_{wu}$, and $P_{w1}$ supplied to each switching element from the PWM converter 3. The inverter 4 supplies the U-phase PWM voltage $v_u$ to the U-phase coil of the motor 6, supplies the V-phase PWM voltage $v_v$ to the V-phase coil, and supplies the V-phase PWM voltage $v_w$ to the V-phase coil. As a result, AC currents $i_u$, $i_v$, and $i_w$ flow to the coils of each phase of the motor 6.

In this manner, the inverter 4 converters the DC voltage from the battery 10 into a three-phase pseudo-sine wave voltage and supplies it to the motor 6. That is, the inverter 4 converts the DC power from the power source to AC power and supplies the AC power to the electric motor apparatus.

The current detectors $5_u$ and $5_v$ detect the U-phase current $i_u$ and the V-phase current $i_v$, respectively, supplied to the motor 6. The current detector $5_u$ is connected to a U-phase power line that connects the inverter 4 and the U-phase coil of the motor 6 and is connected to a V-phase power line that connects the inverter 4 and the V-phase coil of the motor 6. The current detectors $5u$ and $5_v$ output detection signals obtained by detecting the U-phase current $i_u$ and the V-phase current $i_v$ to the PWM converter 3 and the uvw-phase/dq-axis converter 9, respectively.

The uvw-phase/dq-axis converter 9 has a conversion unit that obtains detection signals of the U-phase current $i_u$ and the V-phase current $i_v$ output from the current detectors $5_u$ and $5_v$ and performs A/D conversion for each detection signal from an analog format to a digital format. In addition, the uvw-phase/dq-axis converter 9 calculates a W-phase current $i_w$ on the basis of the U-phase current $i_u$ and the V-phase current $i_v$ subjected to the A/D conversion using a relationship of the following Equation (2).

[Equation 2]

$$i_w = -i_u - i_v \qquad (2)$$

The uvw-phase/dq-axis converter 9 converts the three-phase currents $i_u$, $i_v$, and $i_w$ flowing to the motor 6 into the d-axis current detection value $i_d$ and the q-axis current detection value $i_q$ on the basis of the electrical angle detection value $\theta$ from the rotor position detector 7 using the following Equation (3).

[Equation 3]

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \qquad (3)$$

The uvw-phase/dq-axis converter 9 outputs the d-axis current detection value $i_d$ and the q-axis current detection value $i_q$ to the motor torque control unit 1. The motor torque control unit 1 feeds back the d-axis current detection value $i_d$ and the q-axis current detection value $i_q$ to the d-axis voltage command value $v_d^*$ and the q-axis voltage command value $v_q^*$ to control the AC power supplied to the motor 6.

Figure 2:
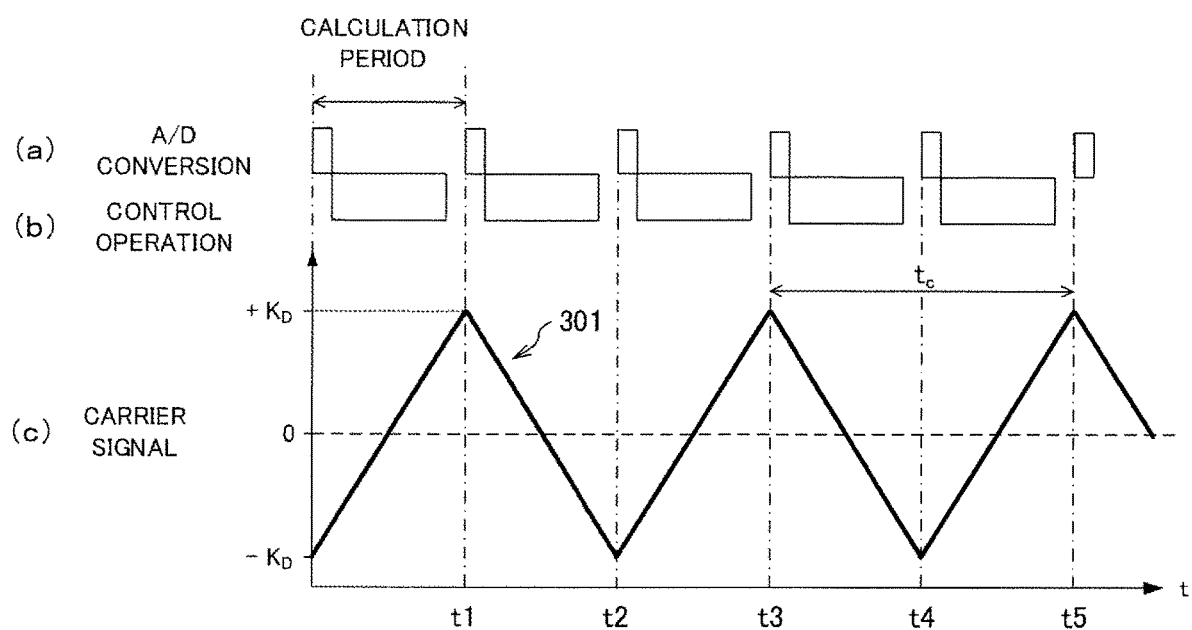
FIG. 2 is a timing chart illustrating a relationship between an A/D conversion timing and a carrier signal in the control apparatus.

FIG. 2 is a timing chart illustrating a relationship between the timings of the A/D conversion performed by the dq-axis/uvw-phase converter 2, the motor rotation speed calculator 8, and the uvw-phase/dq-axis converter 9 and the carrier signals generated in the PWM converter 3.

FIG. 2(a) is a diagram illustrating the A/D conversion timing, and FIG. 2(b) is a diagram illustrating a timing of control operation performed by the motor torque control unit 1 and the PWM converter 3. FIG. 2(c) is a diagram illustrating a waveform of the carrier signal 301 generated by the PWM converter 3. Note that the abscissas of each of FIGS. 2(a) to 2(c) are common as a time axis.

As illustrated in FIG. 2(c), the PWM converter 3 generates a triangular wave as the carrier signal 301 in order to generate the PWM signal. An amplitude $K_D$ and a cycle $t_c$ of the triangular wave are appropriately set depending on a design of the control apparatus 100 or the like.

As illustrated in FIGS. 2(a) and 2(b), the A/D conversion is performed at the timings t1 to t5 at which the triangular wave has a peak and a valley. That is, the A/D conversion is performed at every half of the cycle $t_c$ of the triangular wave (operation period). When the A/D conversion is completed, a control operation for controlling the motor 6 is executed on the basis of the detection values and the command values obtained through the A/D conversion.

In this manner, since the current value of the motor 6 is sampled at peaks and valleys of the triangular wave, a center timing of the pulse of the PWM voltage is delayed with respect to the A/D conversion timing if the PWM converter 3 adds the dead time to the PWM signal.

If the A/D conversion timing and the center timings of the ON and OFF periods of the PWM voltage are deviated, the A/D converted current data represent a collapsed sinusoidal waveform. That is, the current data subjected to the A/D conversion contains a harmonic component as a noise. Therefore, the accuracy for detecting the AC current supplied to the motor 6 is degraded.

In this regard, according to this embodiment, in order to suppress a pulse delay of the PWM signal, the PWM converter 3 corrects a duty command value depending on whether the carrier signal is increasing or decreasing.

Figure 3:
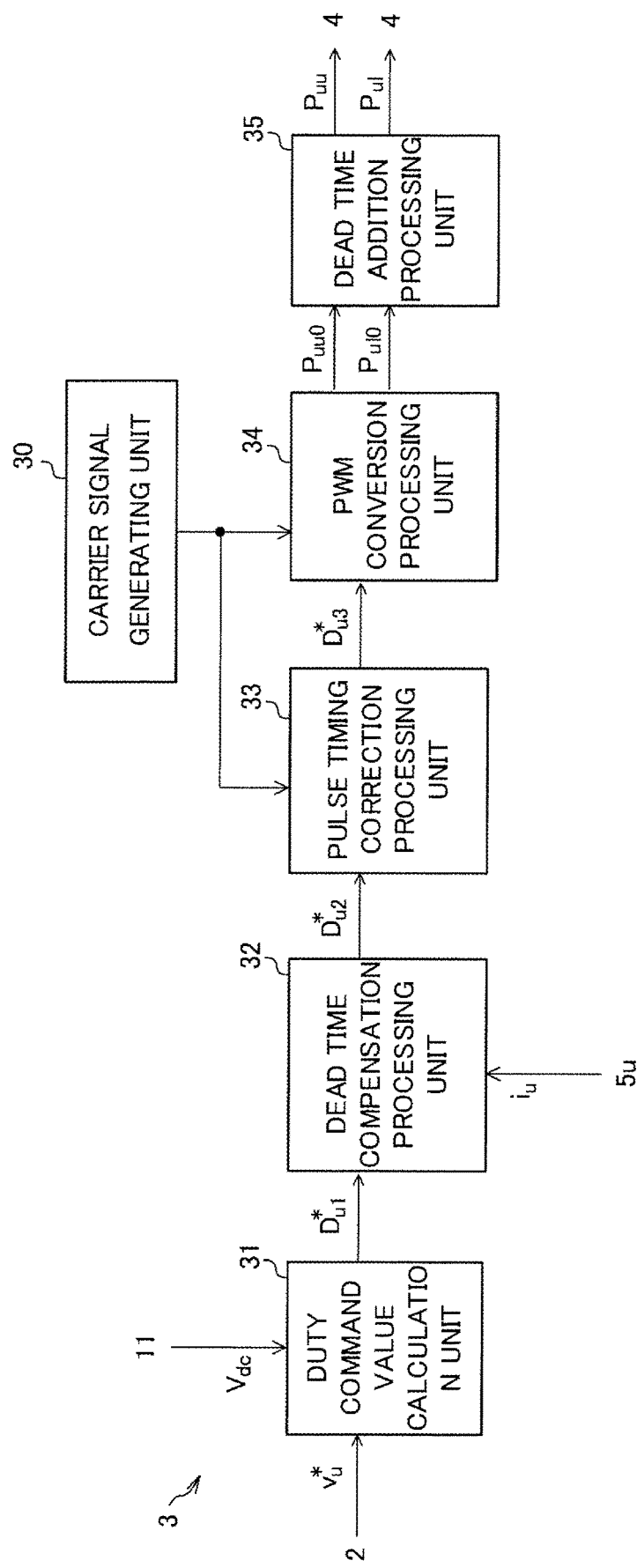
FIG. 3 is a block diagram illustrating an exemplary configuration of the PWM converter according to an embodiment of the invention.

FIG. 3 is a block diagram illustrating an exemplary configuration of the PWM converter 3 according to this embodiment. In FIG. 3, a configuration for generating driving signals $P_{uu}$ and $P_{ul}$ of a pair of switching elements corresponding to the U-phase is illustrated.

The PWM converter 3 includes a carrier signal generating unit 30, a duty command value calculation unit 31, a dead time compensation processing unit 32, a pulse timing correction processing unit 33, a PWM conversion processing unit 34, and a dead time addition processing unit 35.

The carrier signal generating unit 30 generates a carrier signal for performing a PWM control for the power supplied to the motor 6. According to this embodiment, the carrier signal generating unit 30 generates a triangular wave as the carrier signal as illustrated in FIG. 2(c). For example, the carrier signal generating unit 30 has a counter to generate a triangular wave by increasing or decreasing a count value as time elapses. The carrier signal generating unit 30 outputs the generated triangular wave to the pulse timing correction processing unit 33 and the PWM conversion processing unit 34.

The duty command value calculation unit 31 calculates the U-phase duty command value $D_{u1}^*$ for performing the PWM control for the power supplied to the U-phase of the motor 6 on the basis of the U-phase voltage command value $v_u^*$ from the dq-axis/uvw-phase converter 2 and the battery voltage detection value $V_{dc}$ from the battery voltage detector 11.

According to this embodiment, the duty command value calculation unit 31 calculates the U-phase duty command value $D_{u1}^*$ using the amplitude $K_D$ of the triangular wave generated from the carrier signal generating unit 30 on the basis of the following Equation (4). The amplitude $K_D$ of the triangular wave is held in the duty command value calculation unit 31 in advance.

[Equation 4]

$$D_{u1}^* = \frac{v_u^*}{V_{dc}/2} \times K_D \quad (4)$$

As expressed in Equation (4), the duty command value calculation unit 31 increases the U-phase duty command value $D_{u1}^*$ as the U-phase voltage command value $v_u^*$ increases. In addition, the duty command value calculation unit 31 increases the U-phase duty command value $D_{u1}^*$ as the battery voltage detection value $V_{dc}$ decreases. The duty command value calculation unit 31 outputs the calculated U-phase duty command value $D_{u1}^*$ to the dead time compensation processing unit 32.

The dead time compensation processing unit 32 performs a dead time compensation processing for the U-phase duty command value $D_{u1}^*$ to compensate a deviation of the pulse width of the U-phase PWM voltage $v_u$ caused by adding the dead time $t_{dt}$ to the PWM signal. The dead time $t_{dt}$ is a constant delay time provided in a pair of PWM signals to prevent a pair of switching elements from being turned on simultaneously. A delay time actually elapsing until the PWM signal is supplied to the motor 6 from generation of the PWM signal may be added to the dead time $t_{dt}$.

The dead time compensation processing unit 32 corrects the U-phase duty command value $D_{u1}^*$ such that a deviation of the pulse width of the U-phase PWM voltage Vu is cancelled out depending on a polarity of the U-phase current $i_u$.

If the U-phase current $i_u$ has a positive value, that is, the U-phase current $i_u$ flows from the inverter 4 to the motor 6, the dead time compensation processing unit 32 corrects the U-phase duty command value $D_{u1}^*$ such that the OFF period of the U-phase PWM voltage $v_u$ is reduced. The term "off period" as used herein refers to a period during which the electric potential of the negative terminal of the battery 10 is applied to the U-phase of the motor 6.

Meanwhile, if the U-phase current $i_u$ has a negative value, that is, if the U-phase current $i_u$ flows from the motor 6 to the inverter 4, the dead time compensation processing unit 32 corrects the U-phase duty command value $D_{u1}^*$ such that the OFF period of the U-phase PWM voltage $v_u$ increases.

According to this embodiment, the dead time compensation processing unit 32 calculates the duty command value $D_{u2}^*$ subjected to the compensation processing by correcting the U-phase duty command value $D_{u1}^*$ on the basis of the U-phase current $i_u$ using the following Equation (5).

[Equation 5]

$$D_{u2}^* = D_{u1}^* + \text{sgn}(i_u) \times 2K_D \frac{t_{dt}}{t_c} \quad (5)$$

On the basis of Equation (5), the dead time compensation processing unit 32 calculates a correction amount $2K_D t_{dt}/t_c$ for correcting the U-phase duty command value $D_{u1}^*$ using the amplitude $K_D$ of the triangular wave, the cycle $t_c$, and the dead time $t_{dt}$ of FIG. 2(c). This correction amount $2K_D t_{dt}/t_c$ is a value obtained by converting a half of the dead time $t_{dt}$ from a time domain to a count value domain of the triangular wave.

If the U-phase current $i_u$ is greater than zero (0), the dead time compensation processing unit 32 adds the aforementioned correction value to the U-phase duty command value $D_{u1}^*$ to output a duty command value $D_{u2}^*$ subjected to the compensation processing. Otherwise, if the U-phase current $i_u$ is smaller than zero, the dead time compensation processing unit 32 subtracts the aforementioned correction amount from the U-phase duty command value $D_{u1}^*$ to output the duty command value $D_{u2}^*$ subjected to the compensation processing.

The pulse timing correction processing unit 33 performs a pulse timing correction processing for correcting a deviation of the pulse timing of the U-phase PWM voltage $v_u$, caused by adding the dead time to the PWM signal, for the duty command value $D_{u2}^*$ subjected to the compensation processing.

According to this embodiment, the pulse timing correction processing unit 33 calculates the corrected duty command value $D_{u3}^*$ by correcting the duty command value $D_{u2}^*$ subjected to the compensation processing depending on whether the carrier signal is increasing or decreasing. The pulse timing correction processing unit 33 changes a sign of the correction amount for correcting the duty command value $D_{u2}^*$ subjected to the compensation processing depending on a polarity of the change amount $\Delta C$ of the triangular wave on the basis of the following Equation (6).

[Equation 6]

$$D^*_{u3} = D^*_{u2} + sgn(\Delta C) \times 2K_D \frac{t_{dt}}{t_c}. \quad (6)$$

A coefficient $2K_D t_{dt}/t_c$ associated with a sign function $sgn(\Delta C)$ of the second term of the right side of Equation (6) is the correction amount. This correction amount $2K_D t_{dt}/t_c$ is a value obtained by converting a half of the dead time $t_{dt}$ from a time domain to a count value domain of the triangular wave.

The change amount $\Delta C$ of the triangular wave is a difference between count values of two triangular waves obtained at different timings during the first control operation. According to this embodiment, the change amount $\Delta C$ of the triangular wave is calculated by subtracting a value $C_1$ obtained from the first triangular wave from a value $C_2$ obtained from the second triangular wave on the basis of the following Equation (7).

[Equation 7]

$$\Delta C = C_2 - C_1 \quad (7)$$

If the change amount $\Delta C$ of the triangular wave calculated on the basis of Equation (7) is greater than zero, the pulse timing correction processing unit 33 determines that the triangular wave is in an increasing period. If the change amount $\Delta C$ of the triangular wave is smaller than zero, the triangular wave is in a decreasing period.

That is, the pulse timing correction processing unit 33 determines whether the triangular wave generated from the carrier signal generating unit 30 is increasing or decreasing. Note that, although the pulse timing correction processing unit 33 obtains the count values of two triangular waves in this embodiment, three or more count values of the triangular wave may be obtained at different timings, and it may be determined whether the triangular wave is increasing or decreasing on the basis of a plurality of the count values.

If the triangular wave is in an increasing period, the pulse timing correction processing unit 33 adds the correction amount $2K_D t_{dt}/t_c$ to the duty command value $D_{u2}^*$ subjected to the compensation processing without switching the sign of the correction value from a positive value (+) to a negative value (−).

Meanwhile, if the triangular wave is in a decreasing period, the pulse timing correction processing unit 33 subtracts the correction amount $2K_D t_{dt}/t_c$ from the duty command value $D_{u2}^*$ subjected to the compensation processing. That is, if the triangular wave is in a decreasing period, the pulse timing correction processing unit 33 switches the sign of the correction amount from a positive value to a negative value.

In this manner, the pulse timing correction processing unit 33 calculates the corrected duty command value $D_{u3}^*$ by changing the sign of the correction amount for correcting the duty command value $D_{u2}^*$ in the increasing period and the decreasing period of the triangular wave. The pulse timing correction processing unit 33 outputs the corrected duty command value $D_{u3}^*$ to the PWM conversion processing unit 34.

The PWM conversion processing unit 34 generates the PWM signals $P_{uu0}$ and $P_{u10}$ for driving a pair of switching elements corresponding to the U-phase on the basis of the corrected duty command value $D_{u3}^*$ and the triangular wave obtained from the carrier signal generating unit 30.

According to this embodiment, as the corrected duty command value $D_{u3}^*$ is obtained, the PWM conversion processing unit 34 switches the triangular wave from an increasing period to a decreasing period or from a decreasing period to an increasing period and then compares the corrected duty command value $D_{u3}^*$ with the triangular wave from the carrier signal generating unit 30.

When the corrected duty command value $D_{u3}^*$ is smaller than the count value of the triangular wave, the PWM conversion processing unit 34 sets the PWM signal $P_{uu0}$ to a high (H) level in order to turn on the upper stage switching element. Meanwhile, when the corrected duty command value $D_{u3}^*$ is greater than the count value of the triangular wave, the PWM conversion processing unit 34 switches the PWM signal $P_{uu0}$ from the H-level to a low (L) level in order to turn off the upper stage switching element.

In addition, when the corrected duty command value $D_{u3}^*$ is smaller than the count value of the triangular wave, the PWM conversion processing unit 34 sets the PWM signal $P_{u10}$ to an L-level in order to turn off the lower stage switching element. Meanwhile, when the corrected duty command value $D_{u3}^*$ is greater than the count value of the triangular wave, the PWM conversion processing unit 34 switches the PWM signal $P_{u10}$ from an L-level to an H-level in order to turn on the lower stage switching element.

The PWM conversion processing unit 34 outputs the PWM signals $P_{uu0}$ and $P_{u10}$ generated in response to the corrected duty command value $D_{u3}^*$ to the dead time addition processing unit 36.

The dead time addition processing unit 35 prepares the dead time $t_{dt}$ in the PWM signal in order to allow a pair of switching elements to have a non-conductive state (OFF) simultaneously. The dead time addition processing unit 35 generates driving signals $P_{uu}$ and $P_{u1}$ to a pair of switching elements corresponding to the U-phase by adding the dead time $t_{dt}$ to each pulse of the PWM signals $P_{uu0}$ and $P_{u10}$ from the PWM conversion processing unit 34.

According to this embodiment, as the PWM signal $P_{uu0}$ is received from the PWM conversion processing unit 34, the dead time addition processing unit 36 generates the driving signal $P_{uu}$ to the upper stage switching element by delaying the rising timing of the PWM signal $P_{uu0}$ by the dead time $t_{dt}$.

As the PWM signal $P_{u10}$ is received from the PWM conversion processing unit 34, the dead time addition processing unit 36 generates the driving signal $P_{u1}$ to the lower stage switching element by delaying the rising timing of the PWM signal $P_{u10}$ by the dead time $t_{dt}$.

The dead time addition processing unit 36 outputs the driving signals $P_{uu}$ and $P_{u1}$ to the control terminals of a pair of switching elements corresponding to the U-phase.

Note that, although FIG. 3 shows a configuration for generating driving signals $P_{uu}$ and $P_{u1}$ on the basis of the U-phase duty command value $D_{u1}^*$, the configuration for generating the V-phase driving signals $P_{vu}$ and $P_{v1}$ and the configuration for generating the W-phase driving signals $P_{wu}$ and $P_{w1}$ are also similar to those of FIG. 2. For this reason, the V-phase and W-phase configurations of the PWM converter 3 will not be described.

Figure 4:
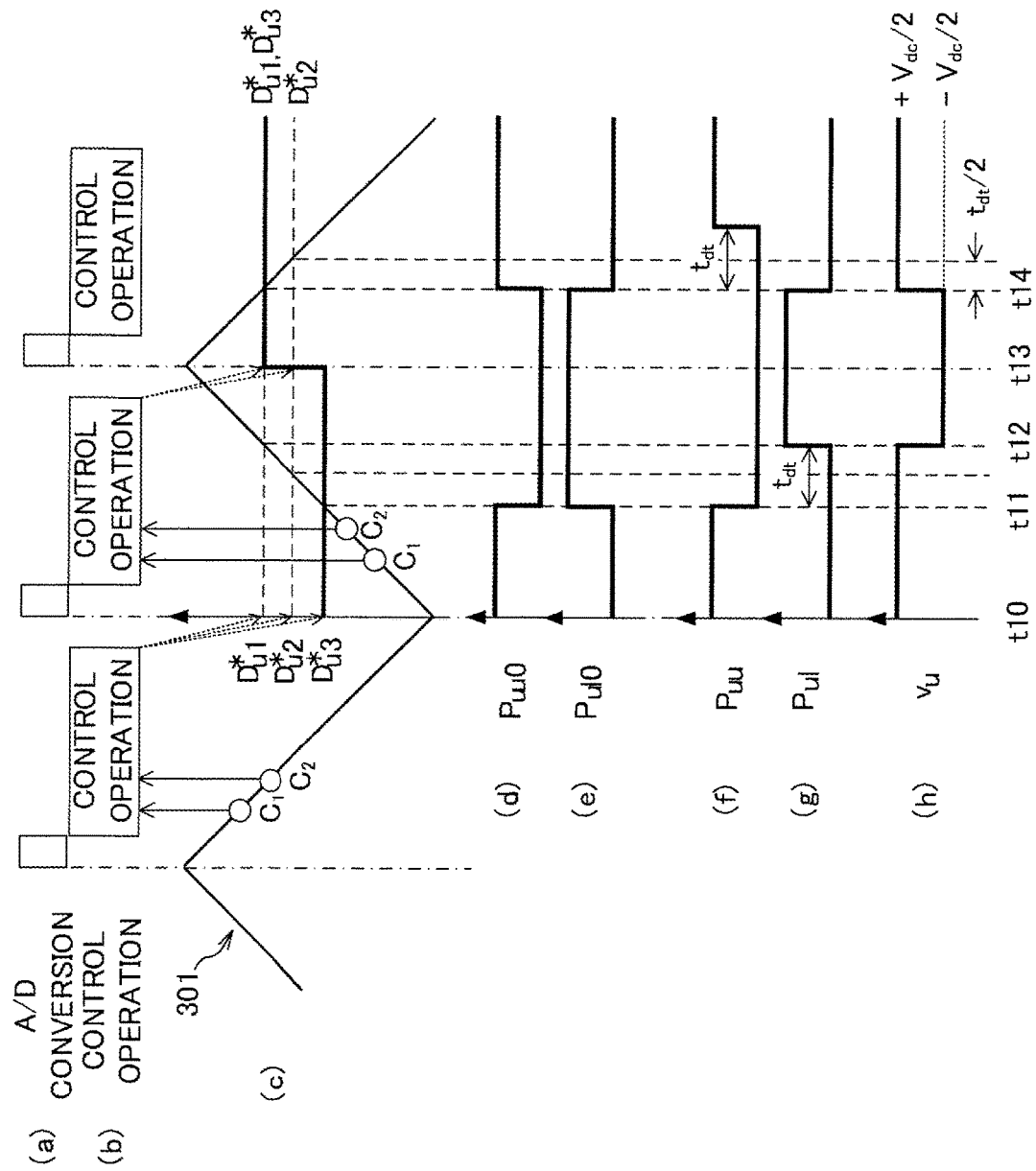
FIG. 4 is a timing chart illustrating an exemplary method of generating a PWM voltage on the basis of a duty command value.

FIG. 4 is a timing chart illustrating an example of the U-phase PWM voltage $v_u$ generated on the basis of the U-phase duty command value $D_{u1}^*$ when the U-phase current $i_u$ has a negative value.

FIG. 4(a) is a diagram illustrating the A/D conversion timing performed by the dq-axis/uvw-phase converter 2, the motor rotation speed calculator 8, and the uvw-phase/dq-axis converter 9. FIG. 4(b) is a diagram illustrating a timing of the control operation performed by the motor torque control unit 1 and the PWM converter 3. FIG. 4(c) is a diagram illustrating a relationship between the U-phase duty command values $D_{u1}^*$, $D_{u2}^*$, and $D_{u3}^*$ and the carrier signal 301.

FIGS. 4(d) and 4(e) are diagrams illustrating pulse waveforms of the PWM signals $P_{uu0}$ and $P_{u10}$ generated by the PWM conversion processing unit 34. FIGS. 4(f) and 4(g) are diagrams illustrating pulse waveforms of the driving signals $P_{uu}$ and $P_{u1}$ generated by the dead time addition processing unit 35.

FIG. 4(h) is a diagram illustrating a pulse waveform of the U-phase PWM voltage $v_u$ generated by the inverter 4 on the basis of the driving signals $P_{uu}$ and $P_{u1}$. Note that abscissas of FIGS. 4(a) to 4(h) are common as a time axis.

As illustrated in FIG. 4(b), the U-phase duty command value $D_{u1}^*$ is calculated during the control operation before the timing t10. Here, since the U-phase current $i_u$ has a negative value, the duty command value $D_{u2}^*$ is calculated by subtracting the correction amount $2K_D t_{dt}/t_c$ from the U-phase duty command value $D_{u1}^*$ on the basis of Equation (5). As a result, since the OFF period of the U-phase PWM voltage $v_u$ increases. Therefore, a deviation of the pulse width caused by adding the dead time is compensated.

In this case, as illustrated in FIGS. 4(b) and 4(c), the pulse timing correction processing unit 33 obtains the count value of the triangular wave two times and calculates a change amount $\Delta C$ by subtracting the first count value $C_1$ from the second count value $C_2$ on the basis of Equation (7). In addition, the pulse timing correction processing unit 33 determines whether the change amount $\Delta C$ of the triangular wave is greater or smaller than zero.

Since the change amount $\Delta C$ of the triangular wave before the timing t10 is smaller than zero, the pulse timing correction processing unit 33 determines that the next operation period from the timing t10 to the timing t13 is in an increasing period of the triangular wave and switches the sign of the correction amount to a negative value. In addition, the pulse timing correction processing unit 33 calculates the corrected duty command value $D_{u3}^*$ by subtracting the correction amount from the duty command value $D_{u2}^*$ subjected to the compensation processing on the basis of Equation (6).

At the timing t10, the triangular wave is in a valley as illustrated in FIG. 4(c), so that the triangular wave is switched from a decreasing period to an increasing period. In addition, the corrected duty command value $D_{u3}^*$ calculated during the decreasing period is compared with the triangular wave.

At the timing t11, the signal levels of the PWM signals $P_{uu0}$ and $P_{u10}$ are switched as illustrated in FIGS. 4(d) and 4(e). By correcting the duty command value $D_{u2}^*$ subjected to the compensation processing in this manner, the switching timings of the PWM signals $P_{uu0}$ and $P_{u10}$ can be expedited by the dead time $t_{dt}$ from the switching timing based on the U-phase duty command value $D_{u1}^*$.

Then, since the dead time addition processing unit 36 delays the rising timing of the PWM signal $P_{u10}$ from the timing t11 by the dead time $t_{dt}$, the pulse of the driving signal $P_{u1}$ rises at the timing t as illustrated in FIG. 4(g).

At the timing t12, the lower stage switching element is switched to the OFF state while the upper stage switching element is turned on. Therefore, as illustrated in FIG. 4(h), the pulse of the U-phase PWM voltage $v_u$ supplied to the motor 6 falls.

In this manner, by using the duty command value $D_{u3}^*$ obtained by subtracting the correction amount from the duty command value $D_{u2}^*$ during the increasing period of the carrier signal, it is possible to match the decreasing timing of the pulse of the U-phase PWM voltage $v_u$ with the switching timing based on the duty command value $D_{u1}^*$.

In this case, as illustrated in FIGS. 4(b) and 4(c), the pulse timing correction processing unit 33 obtains the count value of the triangular wave two times and calculates the change amount $\Delta C$ of the triangular wave. In addition, the pulse timing correction processing unit 33 determines that the next operation period is a decreasing period of the triangular wave and switches the sign of the correction amount to a positive value because the change amount $\Delta C$ of the triangular wave is greater than zero.

The pulse timing correction processing unit 33 calculates the corrected duty command value $D_{u3}^*$ by adding the correction amount to the duty command value $D_{u2}^*$ subjected to the compensation processing. As a result, the corrected duty command value $D_{u3}^*$ becomes equal to the U-phase duty command value $D_{u1}^*$.

At the timing t13, the triangular wave is in a peak as illustrated in FIG. 4(c), and the triangular wave is switched from an increasing period to a decreasing period, so that the corrected duty command value $D_{u3}^*$ calculated during the increasing period is compared with the triangular wave.

At the timing t14, the signal levels of the PWM signals $P_{uu0}$ and $P_{u10}$ are switched as illustrated in FIGS. 4(d) and 4(e). In addition, as illustrated in FIG. 4(f), the dead time addition processing unit 36 delays the rising timing of the driving signal $P_{uu}$ from the timing t14 by the dead time $t_{dt}$.

In this case, since the lower stage switching element is switched to the ON state while the upper stage switching element is turned off, the pulse of the U-phase PWM voltage $v_u$ supplied to the motor 6 rises as illustrated in FIG. 4(h).

In this manner, by using the duty command value $D_{u3}^*$ obtained by adding the correction amount to the duty command value $D_{u2}^*$ during the decreasing period of the carrier signal, it is possible to match the rising timing of the pulse of the U-phase PWM voltage $v_u$ with the switching timing based on the duty command value $D_{u1}^*$.

As described above, when the U-phase current $i_u$ has a negative value, the duty command value $D_{u2}^*$ subjected to the compensation processing is corrected such that the A/D conversion timing matches with the center timing of the pulse of the three-phase PWM voltage. Similarly, even when the U-phase current $i_u$ has a positive value, the duty command value $D_{u2}^*$ subjected to the compensation processing is corrected such that the A/D conversion timing matches with the center timing of the pulse of the three-phase PWM voltage.

In general, if the dead time is added to the PWM signal, the pulse width of the actual PWM voltage applied to the motor 6 changes depending on a flow direction of the current. In addition, the phase of the PWM voltage is delayed by a half of the dead time with respect to the triangular wave.

In comparison, the U-phase duty command value $D_{u1}^*$ is corrected such that a deviation of the pulse width is cancelled out by the dead time compensation processing unit 32 of FIG. 3. In addition, the U-phase duty command value $D_{u1}^*$ is corrected such that a deviation of the phase of the PWM voltage is cancelled out by the pulse timing correction processing unit 33. For this reason, it is possible to suppress a phase deviation of the three-phase PWM voltages as well as a deviation of the pulse width of the three-phase PWM voltages.

In particular, a phase deviation is suppressed without changing the pulse width of each PWM voltage by correcting the duty command value $D_{u2}^*$ depending on whether the carrier signal is increasing or decreasing. Therefore, it is possible to match the A/D conversion timing with the center timing of the pulse of the three-phase PWM voltage.

As a result, it is possible to suppress a harmonic component caused by a waveform collapse from being mixed with the current data obtained by A/D converting the current of the motor 6. It is possible to suppress degradation of torque control accuracy using the motor torque control unit 1 that performs a feedback control using the current data.

Note that, when the U-phase current $i_u$ has a negative value, the duty command value $D_{u2}^*$ subjected to the compensation processing is corrected such that the OFF period of the U-phase PWM voltage $v_u$ matches with the OFF period based on the U-phase duty command value $D_{u1}^*$ as illustrated in FIG. 4. Meanwhile, when the U-phase current $i_u$ has a positive value, the OFF period of the U-phase PWM voltage $v_u$ is corrected to be shorter than the OFF period based on the U-phase duty command value $D_{u1}^*$.

Figure 5:
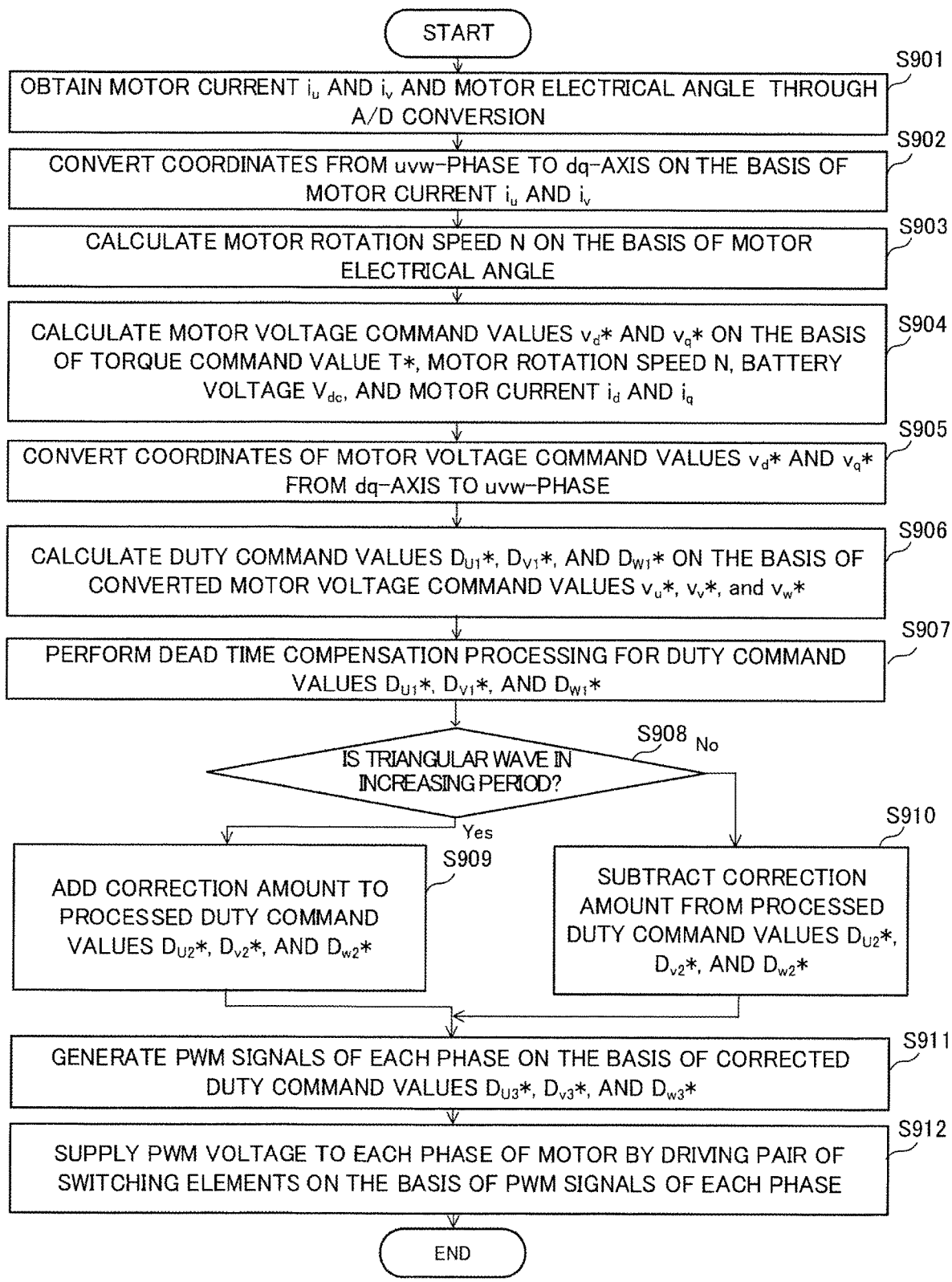
FIG. 5 is a flowchart illustrating an exemplary processing sequence of a control method for controlling a motor according to an embodiment of the invention.

FIG. 5 is a flowchart illustrating an exemplary processing sequence of the control method of the control apparatus 100 according to this embodiment. This control method is repeatedly executed at the timing when the triangular wave generated by the carrier signal generating unit 30 is in a peak and a valley.

In step S901, the uvw-phase/dq-axis converter 9 performs A/D conversion for the detection signal from the current detector $5_u$ and $5_v$ to obtain current data representing the U-phase current $i_u$ and the V-phase current $i_v$. In addition, the motor rotation speed calculator 8 performs A/D conversion for the detection signal from the rotor position detector 7 to obtain the electrical angle detection value θ.

In step S902, the uvw-phase/dq-axis converter 9 converts the U-phase current $i_u$ and the V-phase current $i_v$ of the current data and the W-phase current $i_w$ obtained from Equation (2) into the d-axis current detection value $i_d$ and the q-axis current detection value $i_q$ on the basis of the electrical angle detection value θ as expressed in Equation (3). In addition, the uvw-phase/dq-axis converter 9 feeds back the d-axis current detection value $i_d$ and the q-axis current detection value $i_q$ to the motor torque control unit 1.

In step S903, the motor rotation speed calculator 8 calculates the motor rotation speed N on the basis of the electrical angle detection value θ. In addition, the motor rotation speed calculator 8 outputs the motor rotation speed N to the motor torque control unit 1.

In step S904, the motor torque control unit 1 calculates the d-axis voltage command value $v_d^*$ and the q-axis voltage command value $v_q^*$ on the basis of the torque command value T*, the battery voltage detection value $V_{dc}$, the motor rotation speed N, the d-axis current detection value $i_d$, and the q-axis current detection value $i_q$.

In step S905, the dq-axls/uvw-phase converter 2 converts the d-axis voltage command value $v_d^*$ and the q-axis voltage command value $v_q^*$ into the three-phase voltage command values $v_u^*$, $v_v^*$, and $v_w^*$ on the basis of the electrical angle detection value θ as expressed in Equation (1). In addition, the dq-axis/uvw-phase converter 2 outputs the converted three-phase voltage command values $v_u^*$, $v_v^*$, and $v_w^*$ to the PWM converter 3.

In step S906, the duty command value calculation unit 31 calculates three-phase duty command values $D_{u1}$, $D_{v1}$, and $D_{w1}$ on the basis of the three-phase voltage command values $v_u^*$, $v_v^*$, and $v_w^*$ and the battery voltage detection value $V_{dc}$ as expressed in Equation (4).

In step S907, the dead time compensation processing unit 32 performs a dead time compensation processing for the duty command values $D_{u1}$, $D_{v1}$, and $D_{w1}$ of each phase. Specifically, the dead time compensation processing unit 32 calculates the duty command value $D_{u2}$, $D_{v2}$, and $D_{w2}$ subjected to the compensation processing on the basis of the three-phase currents $i_u$, $i_v$, and $i_w$ of the motor 6 and the three-phase duty command value $D_{u1}$, $D_{v1}$, and $D_{w1}$ as expressed in Equation (5). As a result, it is possible to suppress a deviation of the pulse width between the PWM voltages $v_u$, $v_v$, and $v_w$ supplied to each phase of the motor 6.

In each processing of the steps S908 to S910, the pulse timing correction processing unit 33 calculates the corrected duty command values $D_{u3}$, $D_{v3}$, and $D_{w3}$ by performing pulse timing correction processing for the duty command values $D_{u2}$, $D_{v2}$, and $D_{w2}$ subjected to the compensation processing.

In step S908, the pulse timing correction processing unit 33 determines whether the operation period in which the count value of the triangular wave is obtained is in an increasing period or a decreasing period of the triangular wave.

In step S909, the pulse timing correction processing unit 33 adds the correction amount $2K_D t_{dt}/t_c$ to the duty command values $D_{u2}$, $D_{v2}$, and $D_{w2}$ subjected to the compensation processing because the next operation period is in a decreasing period if the triangular wave is in the increasing period as expressed in Equation (6). As a result, it is possible to delay the switching timing of the PWM signals $P_{uu0}$ and $P_{u10}$ by a half of the dead time $t_{dt}$ while the triangular wave is decreasing.

In step S910, the pulse timing correction processing unit 33 subtracts the correction amount $2K_D t_{dt}/t_c$ from the duty command values $D_{u2}$, $D_{v2}$, and $D_{w2}$ subjected to the compensation processing because the next operation period is in the increasing period if the triangular wave is in the decreasing period. As a result, it is possible to expedite the switching timing of the PWM signals $P_{uu0}$ and $P_{u10}$ by a half of the dead time $t_{dt}$ while the triangular wave is increasing.

In this manner, the pulse timing correction processing unit 33 switches a sign of the correction amount depending on whether the carrier signal is increasing or decreasing. Therefore, it is possible to suppress a phase deviation of the pulses of the three-phase PWM voltages $v_u$, $v_v$, and $v_w$ as illustrated in FIG. 4(h).

In step S911, the PWM conversion processing unit 34 generates PWM signals $P_{uu0}$, $P_{u10}$, $P_{vu0}$, $P_{v10}$, $P_{vu0}$, and $P_{v10}$ to a pair of switching elements of each phase on the basis of the corrected duty command values $D_{u3}^*$, $D_{v3}^*$, and $D_{w3}^*$. In addition, the dead time addition processing unit 35 generates driving signals $P_{uu}$, $P_{u1}$, $P_{vu}$, $P_{v1}$, $P_{wu}$, and $P_{w1}$ by adding the dead time to the PWM signals $P_{uu0}$, $P_{u10}$, $P_{vu0}$, $P_{v10}$, $P_{wu0}$, $P_{w10}$ of each phase as illustrated in FIGS. 4(d) to 4(g).

The dead time addition processing unit 35 outputs the driving signals $P_{uu}$ and $P_{u1}$ to each control terminal of a pair of switching elements corresponding to the U-phase, outputs the driving signals $P_{vu}$ and $P_{v1}$ to each control terminal of a pair of switching elements corresponding to the V-phase, and outputs the driving signals $P_{wu}$ and $P_{w1}$ to each control terminal of a pair of switching elements corresponding to the W-phase.

In step S912, the inverter 4 drives a pair of switching elements of each phase on the basis of each driving signals $P_{uu}$, $P_{u1}$, $P_{vu}$, $P_{v1}$, $P_{wu}$, and $P_{w1}$ and supplies the PWM voltages $v_u$, $v_v$, and $v_w$ to each phase of the motor 6, respectively. Then, a series of processing procedures of the control method of the control apparatus 100 are terminated.

According to the first embodiment of the present invention, the control apparatus 100 has a pair of switching elements that convert the power from the power source 10 into AC power and supply the AC power to the electric motor apparatus. The control apparatus 100 obtains a current or voltage signal supplied to the motor 6 and performs A/D conversion from an analog format to a digital format for the obtained signals.

In addition, the control apparatus 100 has the duty command value calculation unit 31 that calculates the duty command value for performing a PWM control for the electric motor apparatus on the basis of the A/D converted signal, and the PWM conversion processing unit 34 that generates the PWM signal on the basis of the duty command value and the carrier signal. In addition, the control apparatus 100 has the inverter 4 that controls driving of the electric motor apparatus by switching the connection state of the switching element on the basis of the PWM signal.

Furthermore, the control apparatus 100 has a pulse timing correction processing unit 33 that determines whether the carrier signal is increasing or decreasing and corrects the duty command value on the basis of the determination result on whether the carrier signal is increasing or decreasing.

As a result, it is possible to adjust a shift of the switching timing of a pair of switching elements for the timing for initiating A/D conversion through the calculation processing of the duty command value. For this reason, a middle timing of the ON period of the PWM voltage for a pair of switching elements can be adjusted to the A/D conversion timing. Therefore, compared to the configuration of the related art in which the A/D conversion timing is uniformly shifted by a predetermined time, it is possible to suppress degradation of detection accuracy for the AC current supplied to the electric motor apparatus regardless of the duty ratio.

According to this embodiment, a motor is employed as the electric motor apparatus, and the inverter 4 is provided with a plurality of pairs of switching elements for each phase of the motor 6. In addition, the pulse timing correction processing unit 33 corrects the duty command value on the basis of whether the carrier signal is increasing or decreasing. Therefore, it is possible to suppress a collapse of the waveform of the current data sampled through the A/D conversion.

Therefore, it is possible to suppress a harmonic component caused by the collapse of the waveform from being mixed with the current data obtained through the A/D conversion. Accordingly, it is possible to suppress degradation of detection accuracy for the AC power supplied to the motor 6. Furthermore, since the control apparatus 100 calculates the duty command value by feeding back the current data of the motor 6, it is possible to suppress degradation of accuracy for controlling the motor torque by suppressing a noise included in the current data.

According to this embodiment, the control apparatus 100 further has the dead time addition processing unit 35 having a PWM signal provided with the dead time at which a pair of switching elements have a non-conducted state simultaneously. In addition, the pulse timing correction processing unit 33 corrects the duty command values $D_{u1}^*$ and $D_{u2}^*$ on the basis of the dead time $t_{dt}$ and the cycle $t_c$ of the carrier signal. As a result, it is possible to suppress a phase delay of the PWM voltage caused by adding the dead time to the PWM signal.

According to this embodiment, the pulse timing correction processing unit 33 switches the correction amount for correcting the duty command value between the increasing period and the decreasing period of the carrier signal.

Specifically, since the duty command value is corrected by switching the sign of the correction amount without changing the correction amount as illustrated in FIG. 5, an absolute value of the correction amount is fixed. Therefore, it is possible to reduce calculation of the correction amount. Accordingly, it is possible to suppress an increase of the control operation caused by the correction processing of the pulse timing. Furthermore, it is possible to suppress deviations of both the pulse width and the phase of the PWM voltage caused by adding the dead time by changing the correction amount for the duty command value $D_{u1}^*$ between the increasing period and the decreasing period of the carrier signal as illustrated in FIG. 4.

According to this embodiment, the control apparatus 100 further has the dead time compensation processing unit 32 that performs a compensation processing for compensating a deviation of the pulse width of the PWM voltage supplied to the motor 6 for the U-phase duty command value $D_{u1}^*$. In addition, the pulse timing correction processing unit 33 corrects the duty command value $D_{u2}^*$ subjected to the compensation processing on the basis of whether the carrier signal is increasing or decreasing as expressed in Equation (6).

In this manner, by executing the correction processing of the pulse timing after the compensation processing of the pulse width, it is possible to suppress deviations of both the pulse width and the phase of the PWM voltage while suppressing an increase of the control operation caused by the correction processing. In addition, it is possible to perform mounting on the control apparatus already provided with the dead time compensation processing unit 32 using a simple configuration.

According to this embodiment, the pulse timing correction processing unit 33 obtains the value of the carrier signal several times during the operation period of FIG. 2 as expressed in Equation (6) and determines whether the carrier signal is increasing or decreasing. In addition, the pulse timing correction processing unit 33 increases or decreases the correction amount of the duty command value on the basis of the determination result. Furthermore, the PWM conversion processing unit 34 generates the PWM signal by comparing the corrected duty command value and the carrier signal in the next operation period after the operation period in which the value of the carrier signal is obtained as illustrated in FIG. 4.

In this manner, by increasing or decreasing the correction amount of the duty command value subjected to the compensation processing depending on whether the carrier signal is increasing or decreasing, it is possible to simultaneously compensate a delay in both the rising and falling timings of the PWM voltage supplied to the motor 6. In addition, by determining whether the carrier signal is increasing or decreasing during the operation period before the operation period in which the corrected duty command value is set, it is possible to reliably set the corrected duty command value at the timing for initiating the A/D conversion.

Note that, although the duty command value subjected to the dead time compensation processing on the basis of Equation (5) is corrected in this embodiment, the dead time compensation processing may be performed for the duty command value using a method different from Equation (5). In this regard, in the following embodiment, a control apparatus that executes the dead time compensation processing using a method different from Equation (5) and a method of correcting the duty command value subjected to the dead time compensation processing will be described.

<Second Embodiment>

A configuration of a control apparatus according to a second embodiment of the present invention will be described.

A basic configuration of the control apparatus according to this embodiment is similar to that of the control apparatus 100 of FIG. 1. For this reason, each configuration of the control apparatus according to this embodiment will be described, in which like reference numerals denote like elements as in FIGS. 1 and 3.

According to this embodiment, the processing caused by the dead time compensation processing unit 32 and the pulse timing correction processing unit 33 of the PWM converter 3 of FIG. 3 is different from that of the first embodiment. For this reason, here, only configurations of the dead time compensation processing unit 32 and the pulse timing correction processing unit 33 will be described in details, and other configurations will not be described repeatedly because they are similar to those of the first embodiment.

Configurations of each phase of the PWM converter 3 are basically similar. Therefore, here, only the configuration of the U-phase will be described.

Similar to the first embodiment, the dead time compensation processing unit 32 calculates the duty command value $D_{u2}^*$ subjected to the compensation processing by correcting the U-phase duty command value $D_{u1}^*$ on the basis of the U-phase current $i_u$.

According to this embodiment, the dead time compensation processing unit 32 corrects the U-phase duty command value $D_{u1}^*$ such that the OFF period of the U-phase PWM voltage $v_u$ increases only in a case where the U-phase current $i_u$ has a negative value as expressed in the following Equation (8).

[Equation 8]

$$D_{u2}^* = \begin{cases} D_{u1}^* - 2K_D \dfrac{2t_{dt}}{t_c} & (i_u < 0) \\ D_{u1}^* & (i_u \geq 0) \end{cases} \quad (8)$$

On the basis of Equation (8), if the U-phase current $i_u$ is equal to or greater than zero, the dead time compensation processing unit 32 outputs the U-phase duty command value $D_{u1}^*$ as the duty command value $D_{u2}^*$ subjected to the compensation processing without correction. Otherwise, if the U-phase current $i_u$ is smaller than zero, the dead time compensation processing unit 32 subtracts the correction amount $2K_D 2t_{dt}/t_{dt}$ from the U-phase duty command value $D_{u1}^*$ and outputs the duty command value $D_{u2}^*$ subjected to the compensation processing. As a result, it is possible to compensate a deviation of the pulse width of the U-phase PWM voltage $v_u$ generated by adding the dead time $t_{dt}$ to the PWM signal from the PWM conversion processing unit 34.

Similar to the first embodiment, the pulse timing correction processing unit 33 calculates the corrected duty command value $D_{u3}^*$ by performing a pulse timing correction processing for the duty command value $D_{u2}^*$ subjected to the compensation processing depending on whether the carrier signal is increasing or decreasing.

According to this embodiment, the pulse timing correction processing unit 33 switches the correction amount for correcting the duty command value $D_{u2}^*$ subjected to the compensation processing to a different value depending on a polarity of the change amount $\Delta C$ of the triangular wave as expressed in the following Equation (9). The change amount $\Delta C$ of the triangular wave is calculated on the basis of the aforementioned Equation (7).

[Equation 9]

$$D_{u3}^* = \begin{cases} D_{u2}^* & (\Delta C < 0) \\ D_{u2}^* + 2K_D \dfrac{2t_{dt}}{t_c} & (\Delta C \geq 0) \end{cases} \quad (9)$$

The second term $2K_D 2t_{dt}/t_c$ of the right side of Equation (9) is the correction amount. This correction amount $2K_D 2t_{dt}/t_c$ is a value obtained by converting a period of the dead time $t_{dt}$ from a time domain to a count value domain of the triangular wave.

On the basis of Equation (9), if the change amount $\Delta C$ of the triangular wave is smaller than zero, the pulse timing correction processing unit 33 determines that the triangular wave is in a decreasing period. If the change amount $\Delta C$ of the triangular wave is equal to or greater than zero, it is determined that the triangular wave is in the increasing period. That is, the pulse timing correction processing unit 33 determines whether the triangular wave output from the carrier signal generating unit 30 is increasing or decreasing.

If the triangular wave is in a decreasing period, the pulse timing correction processing unit 33 outputs the duty command value $D_{u2}^*$ subjected to the compensation processing as the corrected duty command value $D_{u3}^*$ because the next operation period is the increasing period of the triangular wave.

Otherwise, if the triangular wave is in an increasing period, the pulse timing correction processing unit 33 adds the correction amount $2K_D 2t_{dt}/t_c$ to the duty command value $D_{u2}^*$ subjected to the compensation processing because the next operation period is in a decreasing period of the triangular wave. That is, if the triangular wave is in an increasing period, the pulse timing correction processing unit 33 switches the correction amount subtracted from the duty command value $D_{u2}^*$ subjected to the compensation processing from zero to a predetermined value $2K_D 2t_{dt}/t_c$.

In this manner, similar to the first embodiment, the pulse timing correction processing unit 33 calculates the corrected duty command value $D_{u3}^*$ by changing the value of the correction amount for correcting the duty command value $D_{u2}^*$ between an increasing period and a decreasing period of the triangular wave.

Figure 6:
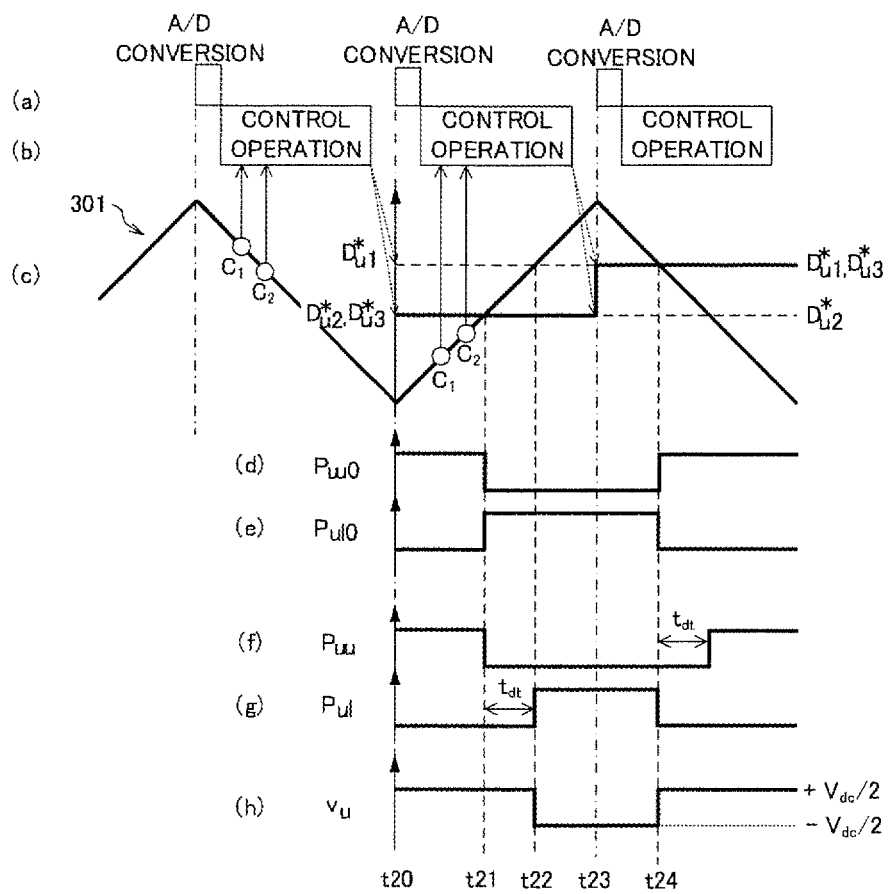
FIG. 6 is a timing chart illustrating a method of correcting the duty command value according to a second embodiment of the invention.

FIG. 6 is a timing chart illustrating an example in which a U-phase PWM voltage $v_u$ is generated from the PWM converter 3 according to this embodiment on the basis of the U-phase duty command value $D_{u1}^*$ when the U-phase current $i_u$ has a negative value.

The ordinates of FIGS. 6(a) to 6(h) are similar to those of FIGS. 4(a) to 4(h). In addition, the abscissas of FIGS. 6(a) to 6(h) are common as a time axis.

In the control operation before the timing t20, the U-phase duty command value $D_{u1}^*$ is calculated as illustrated in FIG. 6(c). Here, since the U-phase current $i_u$ has a negative value, the duty command value $D_{u2}^*$ is calculated by subtracting the correction amount $2K_D 2t_{dt}/t_c$ from the U-phase duty command value $D_{u1}^*$ on the basis of Equation (8).

In this case, as illustrated in FIGS. 6(b) and 6(c), the pulse timing correction processing unit 33 obtains the count value of the triangular wave two times and calculates the change amount $\Delta C$ by subtracting the first count value $C_1$ from the second count value $C_2$ on the basis of Equation (7).

Since the change amount ΔC of the triangular wave before the timing t20 is smaller than zero, the pulse timing correction processing unit 33 determines that the next operation period from the timing t20 to the timing t23 is in an increasing period of the triangular wave and switches the correction amount to zero as expressed in Equation (9). For this reason, the pulse timing correction processing unit 33 sets the duty command value $D_{u2}^*$ subjected to the compensation processing as the corrected duty command value $D_{u3}^*$.

As a result, as illustrated in FIGS. 6(d) and 6(e), the switching timings of the PWM signals $P_{uu0}$ and $P_{u10}$ advances by the dead time $t_{dt}$ from the switching timing t22 based on the U-phase duty command value $D_{u1}^*$. For this reason, the PWM signals $P_{uu0}$ and $P_{u10}$ are switched at the timing t21.

As illustrated in FIG. 6(g), the dead time compensation processing unit 32 delays the rising timing of the PWM signal $P_{u10}$ by the dead time $t_{dt}$ from the timing t21. As a result, the pulse of the driving signal $P_{u1}$ rises at the switching timing t22 based on the U-phase duty command value $D_{u1}^*$.

As a result, at the switching timing t22 based on the U-phase duty command value $D_{u1}^*$, the pulse of the U-phase PWM voltage $v_u$ falls, and the U-phase PWM voltage $v_u$ is in the OFF period as illustrated in FIG. 6(h).

In this case, as illustrated in FIGS. 6(b) and 6(c), the pulse timing correction processing unit 33 obtains the count value of the triangular wave two times and calculates the change amount ΔC of the triangular wave. Since the change amount ΔC of the calculated triangular wave is greater than zero, the pulse timing correction processing unit 33 determines that the next operation period is in a decreasing period of the triangular wave and switches the correction amount to a value greater than zero, $2K_D 2t_{dt}/t_c$.

The pulse timing correction processing unit 33 calculates the corrected duty command value $D_{u3}^*$ by subtracting the correction amount from the duty command value $D_{u2}^*$ subjected to the compensation processing on the basis of Equation (9). As a result, the corrected duty command value $D_{u3}^*$ becomes equal to the duty command value $D_{u3}^*$ of FIG. 4.

As a result, at the timing t24, the signal levels of the PWM signals $P_{uu0}$ and $P_{u10}$ are switched as illustrated in FIGS. 6(d) and 6(e), so that the driving signal $P_{u1}$ of the lower stage switching element falls as illustrated in FIG. 6(g). Therefore, at the switching timing t24 based on the U-phase duty command value $D_{u1}^*$, the pulse of the U-phase PWM voltage $v_u$ rises as illustrated in FIG. 6(h).

In this manner, by switching the correction amount for correcting the duty command value $D_{u2}^*$ subjected to the compensation processing between an increasing period and a decreasing period of the carrier signal, it is possible to match the switching timing of the pulse of the PWM voltage $v_u$ with the switching timing based on the U-phase duty command value $D_{u1}^*$.

Figure 7:
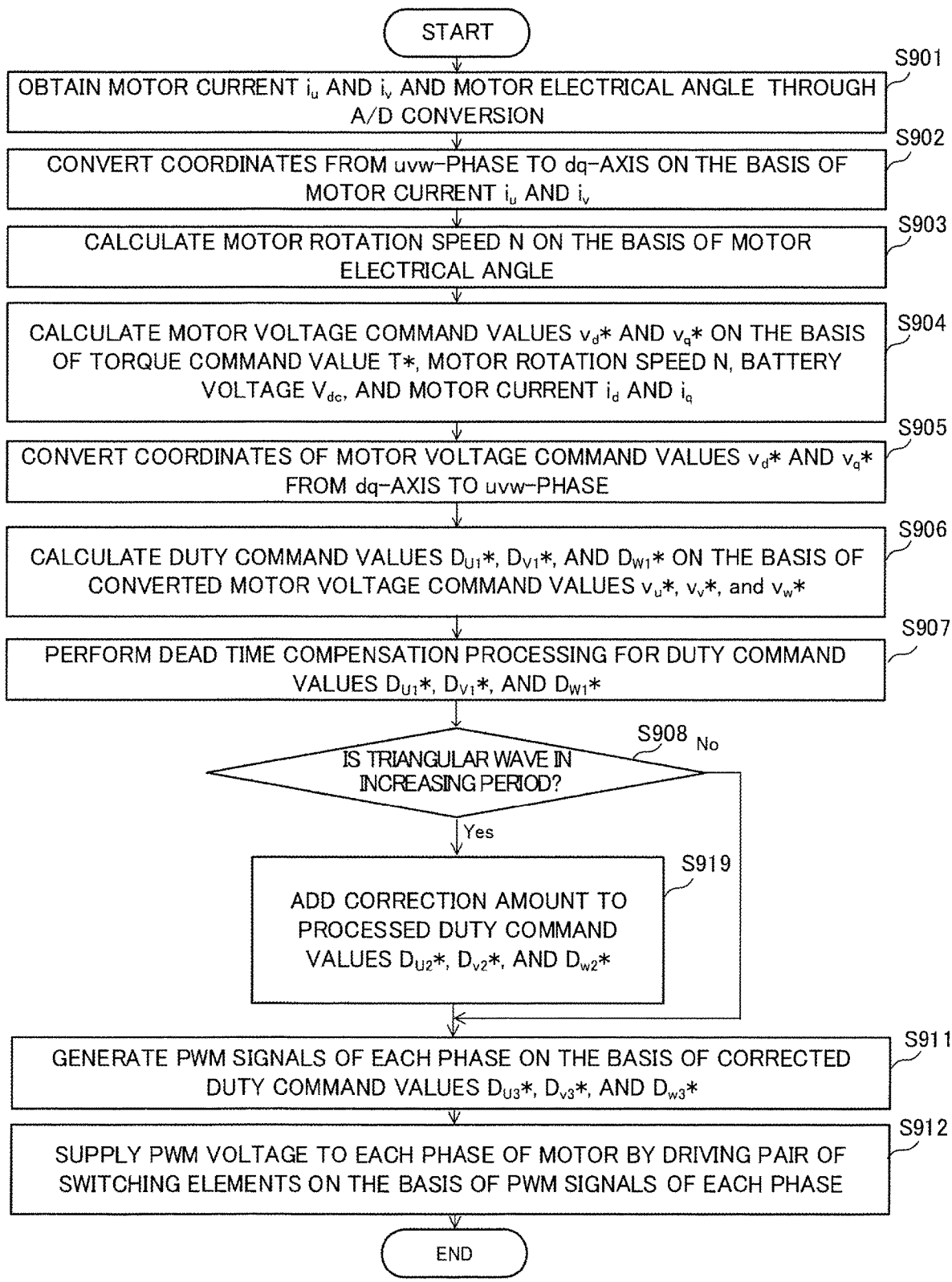
FIG. 7 is a flowchart illustrating an exemplary processing sequence of the control method according to an embodiment of the invention.

FIG. 7 is a flowchart illustrating an exemplary processing sequence of the control method according to this embodiment. This control method is executed repeatedly in every operation period of FIG. 2.

In the control method according to this embodiment, each processing of steps S917 and S919 is added instead of each processing of steps S907, S909, and S910 of FIG. 5. For this reason, here, only each processing of steps S917 and S919 will be described in details.

In step S917, the dead time compensation processing unit 32 performs a dead time compensation processing for the duty command value $D_{u1}$, $D_{v1}$, and $D_{w1}$ calculated in step S906. According to this embodiment, the dead time compensation processing unit 32 calculates the duty command values $D_{u2}$, $D_{v2}$, and $D_{w2}$ subjected to the compensation processing on the basis of the currents $i_u$, $i_v$, and $i_w$ of the motor 6 of each phase and the duty command values $D_{u1}$, $D_{v1}$, and $D_{w1}$ as expressed in Equation (8). As a result, it is possible to suppress a deviation of the pulse width of the three-phase PWM voltage supplied to the motor 6.

In step S908, the pulse timing correction processing unit 33 determines whether the triangular wave is in an increasing period or a decreasing period. If the triangular wave is in a decreasing period, the pulse timing correction processing unit 33 advances to the processing of step S911 without correcting the duty command values $D_{u2}^*$, $D_{v2}^*$, and $D_{w2}^*$ subjected to the compensation processing.

As a result, as illustrated in FIG. 6, the rising timing of the PWM signal $P_{u10}$ advances by the dead time $t_{dt}$. Therefore, it is possible to match the falling timing of the U-phase PWM voltage $v_u$ with the switching timing based on the U-phase duty command value $D_{u1}^*$.

In step S919, if the triangular wave is in an increasing period, the pulse timing correction processing unit 33 adds the correction amount $2K_D 2t_{dt}/t_c$ to the duty command value $D_{u2}^*$, $D_{v2}^*$, and $D_{w2}^*$ subjected to the compensation processing as expressed in Equation (9), and the process advances to step S911.

As a result, as illustrated in FIG. 6, the falling timing of the driving signal $P_{u1}$ becomes the switching timing based on the U-phase duty command value $D_{u1}^*$. Therefore, it is possible to match the rising timing of the PWM voltage $v_u$ with the switching timing based on the U-phase duty command value $D_{u1}^*$.

According to the second embodiment of the present invention, the pulse timing correction processing unit 33 switches the correction amount of the duty command value calculated on the basis of Equation (8) into different values between an increasing period and a decreasing period of the carrier signal as expressed in Equation (9). As a result, similar to the first embodiment, it is possible to suppress a deviation of both the pulse width and the phase of the PWM voltage caused by adding the dead time.

<Third Embodiment>

A configuration of a control apparatus according to a third embodiment of the present invention will be described.

According to this embodiment, the processings of the dead time compensation processing unit 32 and the pulse timing correction processing unit 33 performed by the PWM converter 3 of FIG. 3 are different from those of the first and second embodiments.

Here, only the dead time compensation processing unit 32 and the pulse timing correction processing unit 33 will be described in details, and other configurations will not be described repeatedly because they are similar to those of the first embodiment. In addition, since each phase of the PWM converter 3 basically has the same configuration, only the configuration of the U-phase will be described.

According to this embodiment, the dead time compensation processing unit 32 corrects the U-phase duty command value $D_{u1}^*$ such that the OFF period of the U-phase PWM voltage $v_u$ decreases only in a case where the U-phase current $i_u$ has a positive value as expressed in the following Equation (10).

[Equation 10]

$$D_{u2}^* = \begin{cases} D_{u1}^* & (i_u < 0) \\ D_{u1}^* + 2K_D \dfrac{2t_{dt}}{t_c} & (i_u \geq 0) \end{cases} \quad (10)$$

On the basis of Equation (10), if the U-phase current $i_u$ is smaller than zero, the dead time compensation processing unit 32 outputs the U-phase duty command value $D_{u1}^*$ as the duty command value $D_{u2}^*$ subjected to the compensation processing without correction. Otherwise, if the U-phase current $i_u$ is equal to or greater than zero, the dead time compensation processing unit 32 adds the correction amount $2K_D 2t_{dt}/t_{dt}$ to the U-phase duty command value $D_{u1}^*$ and outputs the duty command value $D_{u2}^*$ subjected to the compensation processing.

According to this embodiment, the pulse timing correction processing unit 33 switches to each other the correction amount of the duty command value $D_{u2}^*$ subjected to the compensation processing to a different value depending on a polarity of the change amount $\Delta C$ of the triangular wave as expressed in the following Equation (11).

[Equation 11]

$$D_{u3}^* = \begin{cases} D_{u2}^* - 2K_D \dfrac{2t_{dt}}{t_c} & (\Delta C < 0) \\ D_{u2}^* & (\Delta C \geq 0) \end{cases} \quad (11)$$

The second term of the right side of Equation (11) is the correction amount. This correction amount $2K_D 2t_{dt}/t_c$ is a value obtained by converting a period of the dead time $t_{dt}$ from a time domain to a count value domain of the triangular wave.

On the basis of Equation (11), if the change amount $\Delta C$ of the triangular wave is smaller than zero, the pulse timing correction processing unit 33 determines that the triangular wave is in a decreasing period. If the change amount $\Delta C$ of the triangular wave is equal to or greater than zero, the pulse timing correction processing unit 33 determines that the triangular wave is in an increasing period. That is, the pulse timing correction processing unit 33 determines whether the triangular wave output from the carrier signal generating unit 30 is increasing or decreasing.

If the triangular wave is in a decreasing period, the pulse timing correction processing unit 33 subtracts the correction amount $2K_D 2t_{dt}/t_c$ from the duty command value $D_{u2}^*$ subjected to the compensation processing because the next operation period is in the increasing period of the triangular wave. That is, if the triangular wave is in a decreasing period, the pulse timing correction processing unit 33 switches the correction amount subtracted from the duty command value $D_{u2}^*$ subjected to the compensation processing from zero to a predetermined value $2K_D 2t_{dt}/t_c$.

Otherwise, if the triangular wave is in an increasing period, the pulse timing correction processing unit 33 outputs the duty command value $D_{u2}^*$ subjected to the compensation processing as the corrected duty command value $D_{u3}^*$ because the next operation period is in the decreasing period of the triangular wave.

In this manner, similar to the aforementioned embodiments, the pulse timing correction processing unit 33 calculates the corrected duty command value $D_{u3}^*$ by changing the correction amount of the duty command value $D_{u2}^*$ between an increasing period and a decreasing period of the triangular wave such that a phase delay of the PWM voltage is compensated.

Figure 8:
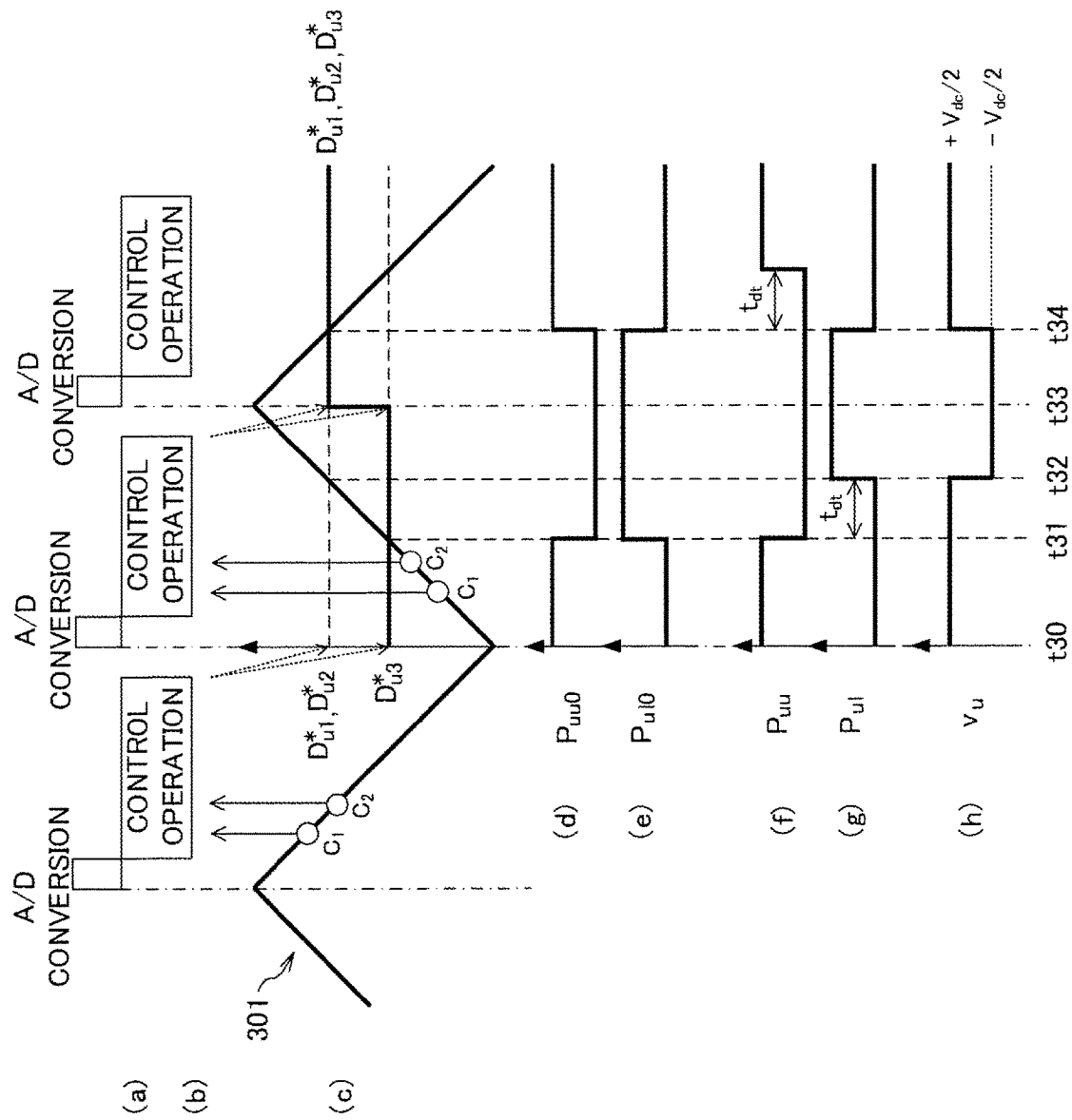
FIG. 8 is a timing chart illustrating a method of correcting a duty command value according to a third embodiment of the invention.

FIG. 8 is a timing chart illustrating an example in which the PWM converter 3 according to this embodiment generates the PWM voltage $v_u$ on the basis of the U-phase duty command value $D_{u1}^*$ in a case where the U-phase current $i_t$ has a negative value.

The ordinates of FIGS. 8(*a*) to 8(*h*) are similar to those of FIGS. 4(*a*) to 4(*h*). In addition, the abscissas of FIGS. 8(*a*) to 8(*h*) are common as a time axis.

During the control operation before the timing t30, the U-phase duty command value $D_{u1}^*$ is calculated as illustrated in FIG. 8(*c*). Here, since the U-phase current $i_u$ has a negative value, the U-phase duty command value $D_{u1}^*$ is set as the duty command value $D_{u2}^*$ without correction on the basis of Equation (10). In this case, as illustrated in FIGS. 8(*b*) and 8(*c*), the pulse timing correction processing unit 33 calculates the change amount $\Delta C$ by subtracting the first count value $C_1$ from the second count value $C_2$ on the basis of Equation (7).

The change amount $\Delta C$ of the triangular wave before the timing t30 is smaller than zero. Therefore, the pulse timing correction processing unit 33 determines that the next operation period from the timing t30 to the timing t33 is in an increasing period of the triangular wave and switches the correction amount to a value $2K_D^2 t_{dt}/t_{dt}$ greater than zero as expressed in Equation (11). In addition, the pulse timing correction processing unit 33 calculates the corrected duty command value $D_{u3}^*$ by subtracting the correction amount $2K_D 2t_c/t_{dt}$ from the duty command value $D_{u2}^*$ subjected to the compensation process.

As a result, as illustrated in FIGS. 8(*d*) and 8(*e*), the switching timings of the PWM signals $P_{uu0}$ and $P_{u10}$ advance from the switching timing t32 based on the U-phase duty command value $D_{u1}^*$ by the dead time $t_{dt}$. For this reason, at the timing t31, the PWM signals $P_{uu0}$ and $P_{u10}$ are switched to each other.

Accordingly, as illustrated in FIG. 8(*g*), the rising timing of the PWM signal $P_{u10}$ is delayed from the timing t31 by the dead time $t_{dt}$. Therefore, at the timing t32, the pulse of the driving signal $P_{u1}$ rises.

As a result, at the switching timing t32 based on the U-phase duty command value $D_{u1}^*$, the pulse of the U-phase PWM voltage $v_u$ falls, and the U-phase PWM voltage $v_u$ is in the OFF period as illustrated in FIG. 8(*h*).

In this case, as illustrated in FIGS. 8(*b*) and 8(*c*), the pulse timing correction processing unit 33 calculates the change amount $\Delta C$ of the triangular wave by obtaining the count value of the triangular wave two times on the basis of Equation (7). Since the calculated change amount $\Delta C$ of the triangular wave is greater than zero, the pulse timing correction processing unit 33 determines that the next operation period is in a decreasing period of the triangular wave and switches the correction amount to zero.

At the timing t33, the pulse timing correction processing unit 33 sets the duty command value $D_{u2}^*$ subjected to the compensation processing as the corrected duty command value $D_{u3}^*$ on the basis of Equation (11). This corrected duty command value $D_{u3}^*$ is equal to the duty command value $D_{u3}^*$ of FIGS. 4 and 6.

As a result, at the timing t34, the signal levels of the PWM signals $P_{uu0}$ and $P_{u10}$ are switched as illustrated in FIGS. 8(*d*) and 8(*e*). Accordingly, the driving signal $P_{u1}$ falls as illustrated in FIG. 8(*g*). Therefore, at the switching timing t34 based on the U-phase duty command value $D_{u1}^*$, the pulse of the U-phase PWM voltage $v_u$ rises as illustrated in FIG. 8(h).

In this manner, by switching the correction amount of the duty command value $D_{u2}^*$ subjected to the compensation processing depending on whether the carrier signal is increasing or decreasing, it is possible to match the switching timing of the U-phase PWM voltage $v_u$ with the switching timing based on the U-phase duty command value $D_{u1}^*$.

Figure 9:
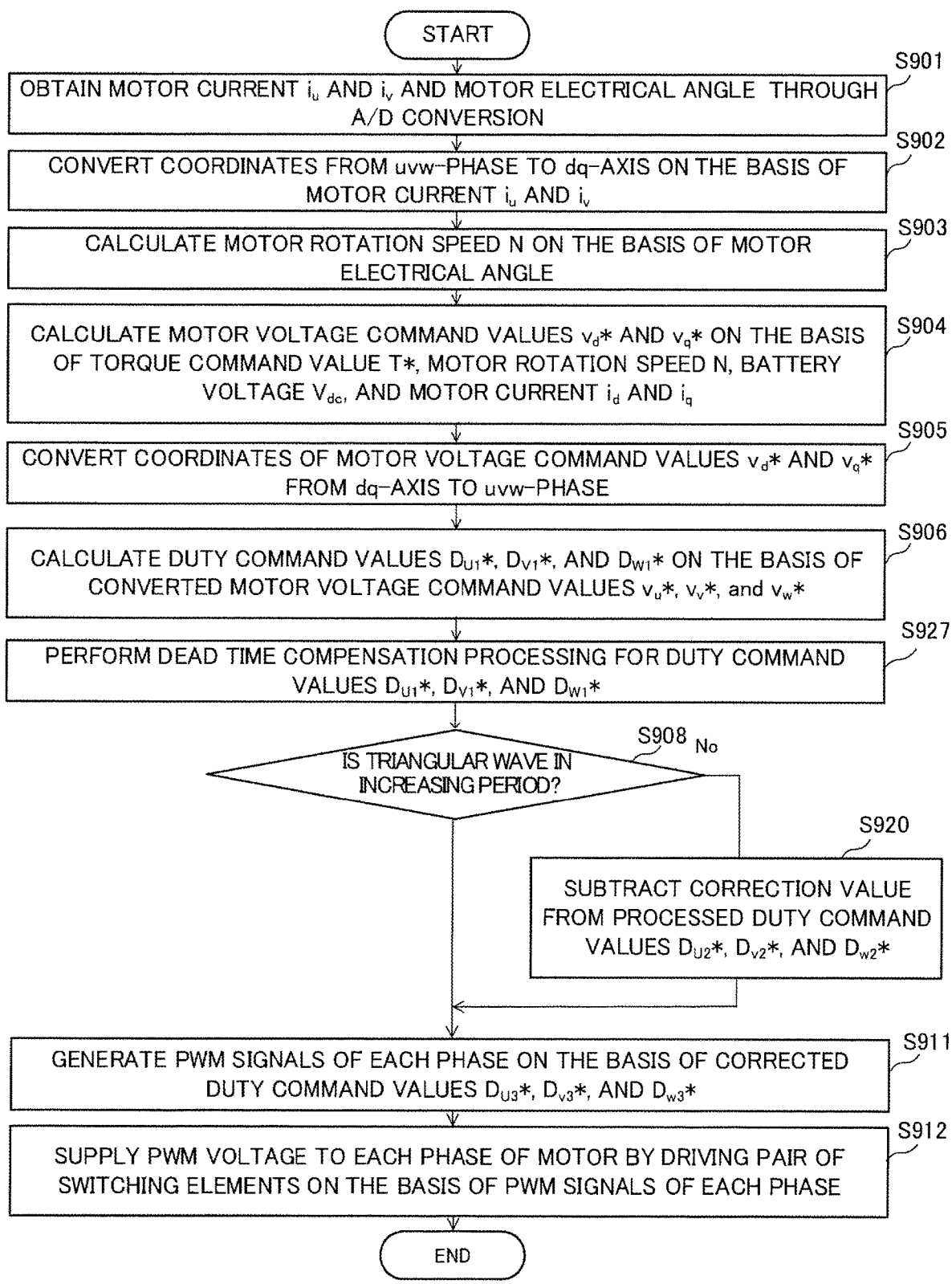
FIG. 9 is a flowchart illustrating an exemplary processing sequence of the control method according to an embodiment of the invention.

FIG. 9 is a flowchart illustrating an exemplary processing sequence of the control method according to this embodiment. This control method is executed repeatedly in every operation period of FIG. 2.

In the control method according to this embodiment, each processing of steps S920 and S927 is added instead of each processing of steps S907, S909, and S910 of FIG. 5. For this reason, here, only each processing of steps S920 and S927 will be described in details.

In step S927, the dead time compensation processing unit 32 performs the dead time compensation processing for the three-phase duty command values $D_{u1}^*$, $D_{v1}^*$, and $D_{w1}^*$ calculated in step S906. According to this embodiment, the dead time compensation processing unit 32 calculates the duty command values $D_{u2}^*$, $D_{v2}^*$, and $D_{w2}^*$ subjected to the compensation processing on the basis of the currents $i_u$, $i_v$, and $i_w$ of each phase of the motor 6 and the duty command value $D_{u1}^*$, $D_{v1}^*$, and $D_{w1}^*$ as expressed in Equation (10). As a result, it is possible to suppress a deviation of the pulse width of the PWM voltage supplied to each phase of the motor 6.

In step S908, the pulse timing correction processing unit 33 determines whether the triangular wave is in an increasing period or a decreasing period. If the triangular wave Is in an increasing period, the pulse timing correction processing unit 33 advances to the processing of step S911 without correcting the duty command values $D_{u2}^*$, $D_{v2}^*$, and $D_{w2}^*$ subjected to the compensation processing.

As a result, as illustrated in FIG. 8, the rising timing of the PWM signal $P_{u10}$ advances by the dead time $t_{dt}$. Therefore, it is possible to match the falling timing of the U-phase PWM voltage $v_u$ with the switching timing based on the U-phase duty command value $D_{u1}$.

In step S920, if the triangular wave is in a decreasing period, the pulse timing correction processing unit 33 subtracts the correction amount $2K_D 2t_{dt}/t_c$ from the duty command values $D_{u2}^*$, $D_{v2}^*$, and $D_{w2}^*$ subjected to the compensation processing as expressed in Equation (11), and the process advances to step S911.

As a result, as illustrated in FIG. 8, the falling timing of the driving signal $P_{u1}$ becomes the switching timing based on the U-phase duty command value $D_{u1}^*$. Therefore, it is possible to match the rising timing of the U-phase PWM voltage $v_u$ with the switching timing based on the U-phase duty command value $D_{u1}^*$.

According to the third embodiment, the pulse timing correction processing unit 33 switches to each other the correction amounts of the duty command values subjected to the compensation processing calculated using Equation (10) to different values between an increasing period and a decreasing period of the carrier signal as expressed in Equation (11). As a result, similar to the aforementioned embodiments, it is possible to suppress a deviation of both the pulse width and the phase of the PWM voltages $v_u$, $v_v$, and $v_w$ of each phase caused by adding the dead time.

Note that, in the aforementioned embodiments, the control apparatus 100 compensates a phase deviation of the PWM voltage caused by adding the dead time to the PWM signal. However, a phase deviation of the PWM voltage may occur even by a delay occurring in a signal transmission circuit disposed in the control apparatus 100 or a response delay of the switching element of the inverter 4 as well as by adding the dead time.

<Fourth Embodiment>

In this regard, an embodiment of a control apparatus capable of compensating a delay in the transmission circuit of the PWM signal and a phase deviation of the PWM voltage caused by a response delay of the switching element as well as a phase delay caused by the dead time will be described.

Figure 10:
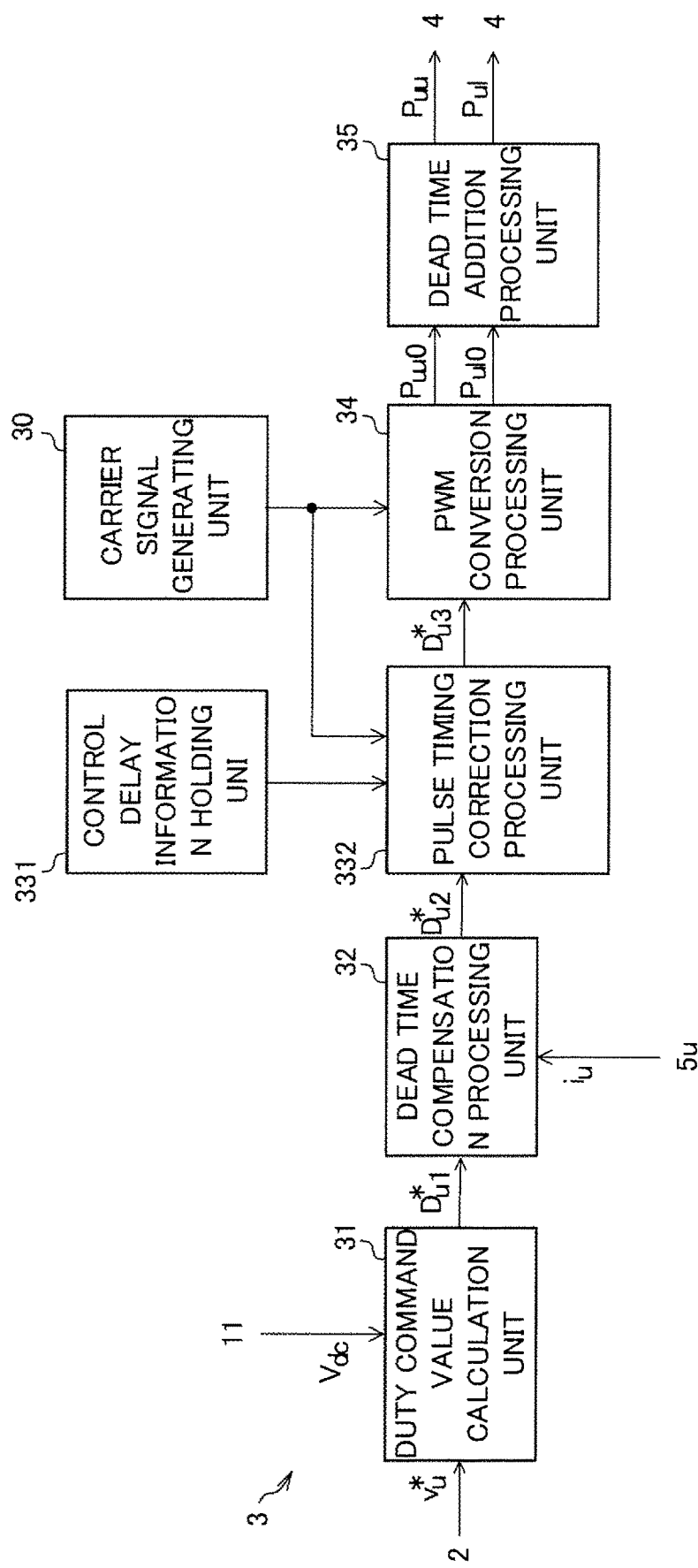
FIG. 10 is a block diagram illustrating an exemplary configuration of a PWM converter according to the third embodiment of the invention.

FIG. 10 is a block diagram illustrating a configuration of a PWM converter 3 according to a fourth embodiment of the invention.

According to this embodiment, the PWM converter 3 has a control delay information holding unit 331 and a pulse timing correction processing unit 332 instead of the pulse timing correction processing unit 33 of FIG. 3. Here, configurations other than the control delay information holding unit 331 and the pulse timing correction processing unit 332 will not be described because they are similar to those of FIG. 3, in which like reference numerals denote like elements.

The control delay information holding unit 331 holds control delay information representing delay times of the driving signals $P_{uu}$ and $P_{u1}$ of a pair of switching elements. According to this embodiment, the control delay information contains a dead time $t_{dt}$, a delay time $t_{dly\_c}$ of the transmission circuit used to transmit the PWM signal generated from the PWM converter 3, and a response delay time $t_{dly\_s}$ of the switching element of the inverter 4.

The delay time $t_{dly\_c}$ of the transmission circuit is a value determined in advance from experimental data and the like. The transmission circuit is a circuit inserted between the dead time addition processing unit 35 and the inverter 4 and includes a noise cut-off filter, a photo-coupler, and the like.

The response delay time $t_{dly\_s}$ of the switching element is an average value of a delay caused by a turn-on time and a delay caused by a turn-off time and is determined in advance from experimental data and the like. The turn-on time is a time taken to turn on the switching element from an OFF state, and the turn-off time is a time taken to turn off the switching element from an ON state.

The pulse timing correction processing unit 332 corrects the duty command value $D_{u2}^*$ subjected to the compensation processing on the basis of the control delay information. That is, the pulse timing correction processing unit 332 corrects the duty command value $D_{u2}^*$ to compensate a phase deviation of the PWM voltage on the basis of at least one of the dead time $t_{dt}$, the response delay time $t_{dly\_s}$ of the switching element, and the response delay time $t_{dly\_s}$ of the switching element.

According to this embodiment, the pulse timing correction processing unit 332 switches the sign of the correction amount for correcting the duty command value $D_{u2}^*$ subjected to the compensation processing depending on the change amount $\Delta C$ of the triangular wave as expressed in the following Equation (12).

[Equation 12]

$$D^*_{u3} = D^*_{u2} + sgn(\Delta C) \times K_{dly} \qquad (12)$$

A coefficient $K_{dly}$ relating to the second term of the right side of Equation (12) is the correction amount, and this correction amount $K_{dly}$ is calculated on the basis of the following Equation (13).

[Equation 13]

$$K_{dly} = 2K_D \frac{t_{dt} + 2t_{dly\_c} + 2t_{dly\_s}}{t_c} \quad (13)$$

On the basis of Equation (12), if the change amount ΔC of the triangular wave is smaller than zero, the pulse timing correction processing unit 332 determines that the triangular wave is in a decreasing period. If the change amount ΔC of the triangular wave is greater than zero, the pulse timing correction processing unit 332 determines that the triangular wave is in an increasing period.

If the triangular wave is in an increasing period, the pulse timing correction processing unit 332 calculates the corrected duty command value $D_{u3}*$ by adding the correction amount $K_{dly}$ to the duty command value $D_{u2}*$ subjected to the compensation processing without changing the sign of the correction amount.

Otherwise, if the triangular wave is in a decreasing period, the pulse timing correction processing unit 332 calculates the corrected duty command value $D_{u3}*$ by subtracting the correction amount $K_{dly}$ from the duty command value $D_{u2}*$ subjected to the compensation processing. That is, if the triangular wave is in a decreasing period, the pulse timing correction processing unit 332 switches the sign of the correction amount from a positive value to a negative value.

In this manner, the pulse timing correction processing unit 33 calculates the corrected duty command value $D_{u3}*$ by changing the sign of the correction amount for correcting the duty command value $D_{u2}*$ between the increasing period and the decreasing period of the triangular wave. The pulse timing correction processing unit 33 outputs the corrected duty command value $D_{u3}*$ to the PWM conversion processing unit 34.

Figure 11:
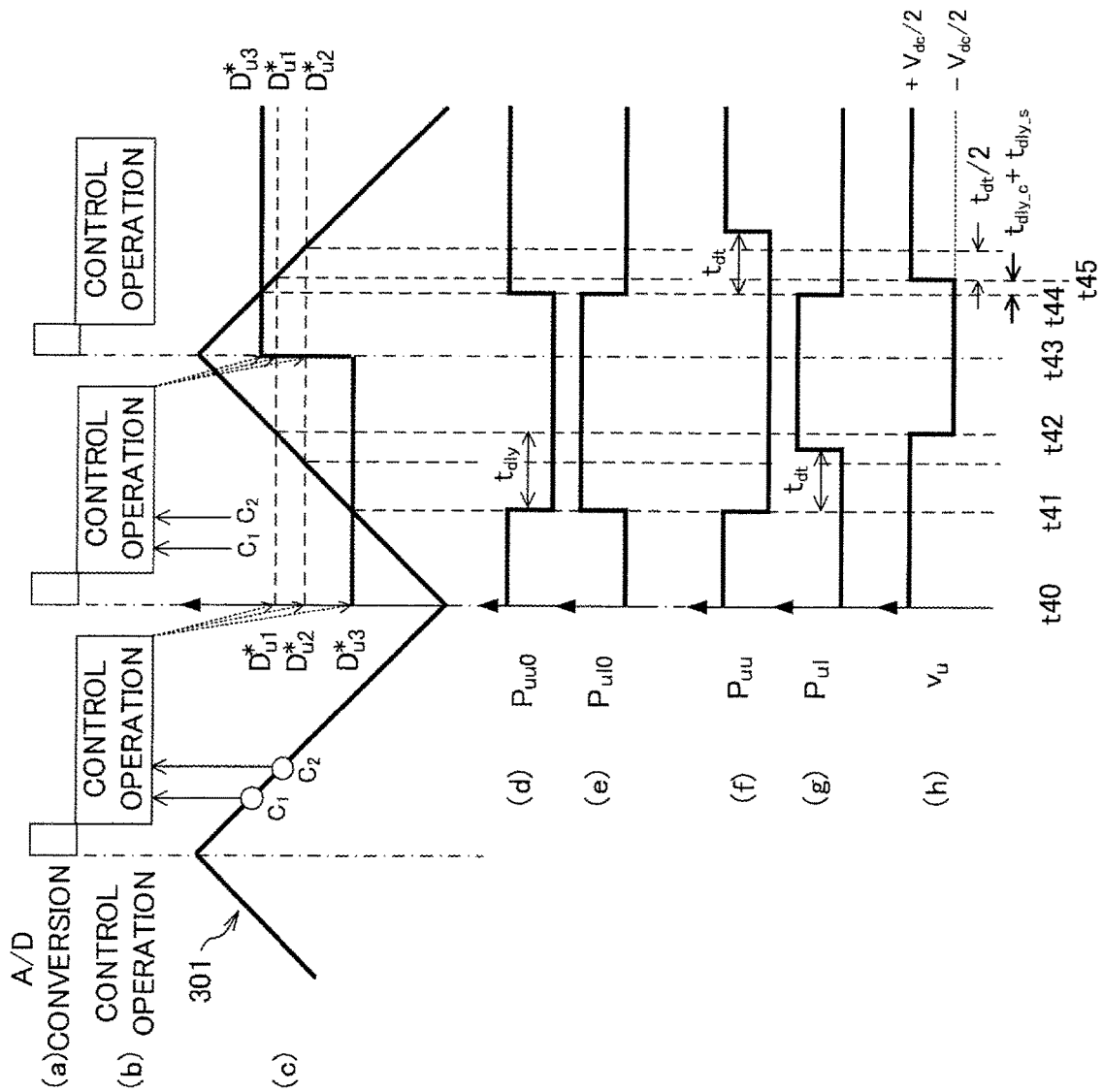
FIG. 11 is a timing chart illustrating a method of correcting the duty command value according to an embodiment of the invention.

FIG. 11 is a timing chart illustrating an example in which the PWM converter 3 according to this embodiment generates the U-phase PWM voltage $v_u$ on the basis of the U-phase duty command value $D_{u1}*$ in a case where the U-phase current $i_u$ has a negative value.

The ordinates of FIGS. 11(a) to 11(h) are similar to those of FIGS. 4(a) to 4(h). In addition, the abscissas of FIGS. 11(a) to 11(h) are common as a time axis.

In the control operation before the timing t40, the U-phase duty command value $D_{u1}*$ is calculated as illustrated in FIG. 11(c). Here, since the U-phase current $i_u$ has a negative value, the duty command value $D_{u2}*$ is calculated by subtracting the correction amount $2K_D t_{dt}/t_c$ from the U-phase duty command value $D_{u1}*$ on the basis of Equation (5).

In this case, as illustrated in FIGS. 11(b) and 11(c), the pulse timing correction processing unit 332 calculates the change amount ΔC by subtracting the first count value $C_1$ from the second count value $C_2$ on the basis of Equation (7). In addition, the pulse timing correction processing unit 332 determines whether the change amount ΔC of the triangular wave is smaller than or greater than zero.

Since the change amount ΔC of the triangular wave before the timing t40 is smaller than zero, the pulse timing correction processing unit 332 determines that the next operation period of the timings t40 to t43 is in an increasing period of the triangular wave and switches the sign of the correction amount to a negative value.

On the basis of Equation (12), the pulse timing correction processing unit 33 calculates the corrected duty command value $D_{u3}*$ by subtracting the correction amount $K_{dly}$ from the duty command value $D_{u2}*$ subjected to the compensation processing. As a result, a phase deviation of the U-phase PWM voltage $v_u$ caused by adding the dead time $t_{dt}$ is compensated, and phase deviation of the U-phase PWM voltage $v_u$ caused by a control delay of the transmission circuit and the switching element is compensated.

At the timing t40, as illustrated in FIG. 11(c), the corrected duty command value $D_{u3}*$ calculated during the decreasing period of the triangular wave is compared with the triangular wave. At the timing t41, as illustrated in FIGS. 11(d) and 11(e), the signal levels of the PWM signals $P_{uu0}$ and $P_{u10}$ are switched. As a result, it is possible to advance the switching timings of the PWM signals $P_{uu0}$ and $P_{u10}$ from the switching timing based on the U-phase duty command value $D_{u1}*$ by the delay time $t_{dly}$ obtained by adding the control delay time ($t_{dly\_c} + t_{dly\_s}$) to a half of the dead time $t_{dt}$.

Then, the dead time addition processing unit 36 delays the rising timing of the PWM signal $P_{u10}$ from the timing t41 by the dead time $t_{dt}$. Therefore, as illustrated in FIG. 11(g), the pulse of the driving signal $P_{u1}$ rises before the timing t42.

At the timing when the pulse of the driving signal $P_{u1}$ rises, the lower stage switching element is switched to the ON state. In this case, as illustrated in FIG. 11(h), the pulse of the PWM voltage $v_u$ supplied to the U-phase of the motor 6 at the timing t42 falls due to a delay of the transmission circuit and a delay caused by the turn-on time of the lower stage switching element.

In this manner, by considering a delay of the transmission circuit or a response delay of the switching element, it is possible to match the falling timing of the pulse of the U-phase PWM voltage $v_u$ with the switching timing based on the U-phase duty command value $D_{u1}*$.

In this case, as illustrated in FIGS. 11(b) and 11(c), the pulse timing correction processing unit 332 calculates the change amount ΔC of the triangular wave and determines that the next operation period is in a decreasing period of the triangular wave because the change amount ΔC of the triangular wave is larger than zero. Then, the pulse timing correction processing unit 332 switches the sign of the correction amount to a positive value.

In addition, the pulse timing correction processing unit 332 calculates the corrected duty command value $D_{u3}*$ by adding the correction amount $K_{dly}$ to the duty command value $D_{u2}*$ subjected to the compensation processing on the basis of Equation (12). As a result, the corrected duty command value $D_{u3}*$ increases over the U-phase duty command value $D_{u1}*$ by the delay of the transmission circuit and the response delay of the switching element.

At the timing t43, the corrected duty command value $D_{u3}*$ calculated during the increasing period of the triangular wave is compared with the triangular wave.

At the timing t44, as illustrated in FIG. 11(e), the signal levels of the PWM signals $P_{uu0}$ and $P_{u10}$ are switched to a L-level, so that the lower stage switching element is switched to an ON state. In this case, as illustrated in FIG. 11(h), the pulse of the U-phase PWM voltage $v_u$ rises at the switching timing t45 based on the U-phase duty command value $D_{u1}*$ due to the delay of the transmission circuit and the response delay of the lower stage switching element.

In this manner, by considering the delay of the transmission circuit or the response delay of the switching element, it is possible to match the rising timing of the pulse of the U-phase PWM voltage $v_u$ with the switching timing based on the U-phase duty command value $D_{u1}*$.

Therefore, by adding the delay time $t_{dly\_c}$ of the transmission circuit and the response delay time $t_{dly\_s}$ of the switching element in addition to the dead time $t_{dt}$, it is possible to allow the switching timing of the U-phase PWM voltage to approach the switching timing based on the U-phase duty command value $D_{u1}^*$.

Note that, although a control delay such as a delay of the transmission circuit or a response delay of the switching element is added to the pulse timing correction processing of the first embodiment according to this embodiment, the control delay may also be included in the pulse timing correction processing of the second and third embodiments in a similar way.

Figure 12:
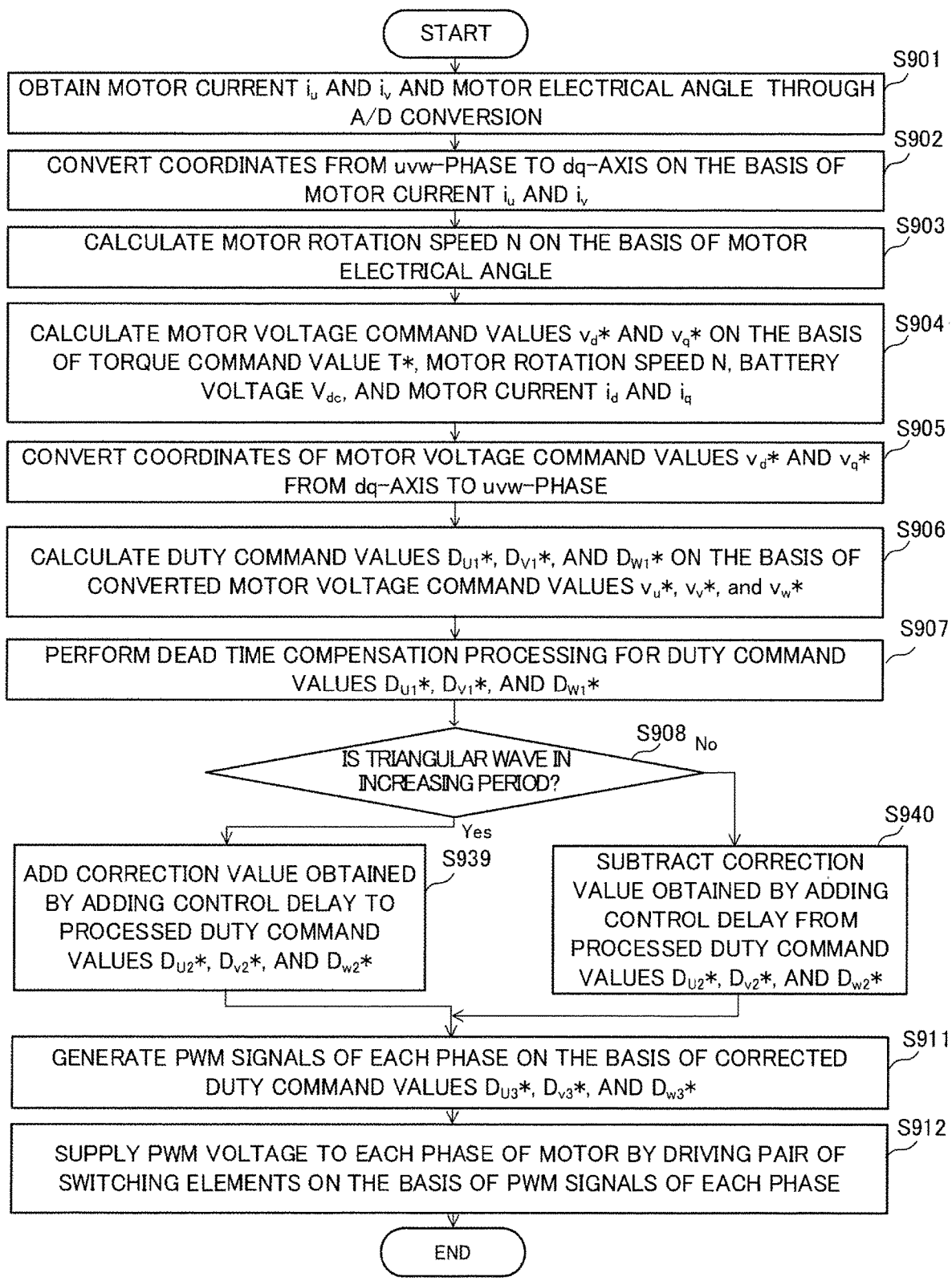
FIG. 12 is a flowchart illustrating an exemplary processing sequence of the control method according to an embodiment of the invention.

FIG. 12 is a flowchart illustrating an exemplary processing sequence of the control method according to this embodiment. This control method is executed repeatedly in every operation period of FIG. 2.

In the control method according to this embodiment, each processing of steps S939 and S940 is added instead of each processing of steps S909 and S910 of FIG. 5. For this reason, here, only each processing of steps S939 and S940 will be described in details.

If it is determined that the triangular wave is in an increasing period in step S908, the pulse timing correction processing unit 332 calculates the corrected duty command value $D_{u3}^*$, $D_{v3}^*$, and $D_{w3}^*$ on the basis of Equation (12) in step S939. Specifically, if the triangular wave is in an increasing period, the pulse timing correction processing unit 332 adds the correction amount $K_{dly}$ obtained by reflecting the control delay to the duty command values $D_{u2}^*$, $D_{v2}^*$, and $D_{w2}^*$ calculated in step S907. Then, the process advances to step S911.

As a result, as illustrated in FIG. 11, the falling timing of the driving signal $P_{u1}$ advances from the switching timing t45 based on the U-phase duty command value $D_{u1}^*$ by the control delay time $(t_{dly\_c}+t_{dly\_s})$ caused by the transmission circuit and the switching element.

In step S940, if the triangular wave is in a decreasing period, the pulse timing correction processing unit 332 subtracts the correction amount $K_{dly}$ obtained by reflecting the control delay from the duty command value $D_{u2}^*$, $D_{v2}^*$, and $D_{w2}^*$ calculated in step S907. Then, the process advances to step S911.

As a result, as illustrated in FIG. 11, the rising timing of the driving signal $P_{u1}$ advances from the switching timing t42 based on the U-phase duty command value $D_{u1}^*$ by the control delay time $(t_{dly\_c}+t_{dly\_s})$.

According to the fourth embodiment of the present invention, the pulse timing correction processing unit 332 corrects the three-phase duty command values $D_{u2}^*$, $D_{v2}^*$, and $D_{w2}^*$ on the basis of the delay $t_{dly\_c}$ of the transmission circuit that transmits a signal from the dead time addition processing unit 35 to the switching element of the inverter 4.

As a result, it is possible to reduce the phase deviation of the PWM voltages $v_u$, $v_v$, and $v_w$ of each phase caused by the delay of the transmission circuit. Therefore, it is possible to allow the center timing of the ON period of the PWM voltage to more approach the A/D conversion timing.

According to this embodiment, the pulse timing correction processing unit 332 corrects the three-phase duty command values $D_{u2}^*$, $D_{v2}^*$, and $D_{w2}^*$ on the basis of the response delay of the switching element. That is, the pulse timing correction processing unit 332 corrects the duty command values $D_{u2}^*$, $D_{v2}^*$, and $D_{w2}^*$ of each phase on the basis of a response delay caused by switching from a conduction state to a non-conduction state of the switching element or a response delay caused by switching from the non-conduction state to the conduction state.

As a result, it is possible to reduce a phase deviation of the PWM voltages $v_u$, $v_v$, and $v_w$ of each phase caused by a response delay of the switching element. Therefore, it is possible to allow the A/D conversion timing and the center timing of the ON period of the PWM voltage to approach each other and more improve the detection accuracy of the motor current.

While the embodiments of the present invention have been described hereinbefore, the aforementioned embodiments are merely for an illustrative purpose regarding a part of applications of the invention and are not intended to limit the technical scope of the invention to specific configurations of the embodiments.

For example, in the aforementioned embodiments, the motor 6 is employed as an example of the electrical unit driven by an AC current. However, the present invention is not limited thereto. For example, the motor 6 may be a motor of an electric pump or the like or may be any apparatus driven by AC power.

In addition, in the aforementioned embodiments, the present invention is applied to a control apparatus that controls the PWM voltage supplied to each phase of the motor 6 by detecting a current supplied to each phase of the motor 6 and feeding back the current data obtained by A/D conversion for the detection signal. Similarly, the present invention may also be applied to a control apparatus that controls the PWM voltage supplied to the electric motor apparatus by detecting a voltage supplied to the electric motor apparatus and feeding back the voltage data obtained by A/D conversion for the detection signal. In this case, the same functional effects as those of the aforementioned embodiments can be achieved by providing a voltage detector for detecting a voltage supplied to the motor 6 instead of the current detectors $5_u$ and $5_v$.

Note that the aforementioned embodiments can be appropriately combined.

The invention claimed is:
1. A control apparatus for controlling an electrical unit driven by AC power, the control apparatus comprising:
   a pair of switching elements configured to convert power from a power source into AC power and supply the AC power to the electrical unit;
   a conversion unit configured to obtain a current or voltage signal supplied to the electrical unit and convert the signal from an analog format to a digital format;
   a calculation unit configured to calculate a duty command value for performing a pulse width modulation (PWM) control for the electrical unit on the basis of the signal converted by the conversion unit;
   a generating unit configured to generate a PWM signal on the basis of the duty command value calculated by the calculation unit and a carrier signal for performing the PWM control;
   a control unit configured to control the AC power supplied to the electrical unit by switching a connection state of a switching element on the basis of the PWM signal generated by the generating unit;
   a dead time compensating unit configured to provide the PWM signal with a dead time in which the pair of switching elements are in a non-conduction state simultaneously, and compensate the duty command value on the basis of the dead time; and
   a correction unit configured to determine whether the carrier signal increases or decreases, and to adjust a switching timing of the switching element by correcting the duty command value compensated by the dead time compensating unit on the basis of whether the carrier signal is increasing or decreasing determined by the correction unit.

2. The control apparatus according to claim 1, wherein the conversion unit is configured to obtain the current or voltage signal and convert the signal from an analog format to a digital format at a middle of switching timings for the pair of switching elements.

3. The control apparatus according to claim 1, wherein the correction unit switches a correction amount for correcting the duty command value between an increasing period and a decreasing period of the carrier signal.

4. The control apparatus according to claim 1, further comprising a compensation unit configured to perform a compensation processing for compensating a deviation of a pulse width of the PWM voltage supplied to the electrical unit for the duty command value, wherein the correction unit corrects the duty command value subjected to the compensation processing on the basis of whether the carrier signal is increasing or decreasing determined by the correction unit to compensate a phase deviation of the PWM voltage supplied to the electrical unit.

5. The control apparatus according to claim 1, wherein the correction unit corrects the duty command value on the basis of the dead time and a cycle of the carrier signal.

6. The control apparatus according to claim 1, wherein the correction unit corrects the duty command value on the basis of a delay generated in a circuit used to transmit a signal from the generating unit to the switching element.

7. The control apparatus according to claim 1, wherein the correction unit corrects the duty command value on the basis of a response delay of the switching element.

8. The control apparatus according to claim 1, wherein the electrical unit is a motor, a plurality of the pairs of switching elements are provided for each phase of the motor, and the correction unit corrects the duty command value on the basis of whether the carrier signal is increasing or decreasing determined by the correction unit so as to suppress a collapse of a voltage or current waveform of at least two phases obtained by the conversion unit.

9. The control apparatus according to claim 1, wherein the correction unit obtains a value of the carrier signal several times in an operation period in which the calculation unit calculates the duty command value and determines whether the carrier signal is increasing or decreasing, the correction unit increases or decreases a correction amount for correcting the duty command value on the basis of a result of the determination, and the generating unit generates the PWM signal by comparing the corrected duty command value and the carrier signal in an operation period next to the operation period in which the correction unit obtains the value of the carrier signal.

10. A control method of a control apparatus provided with a pair of switching elements configured to convert power from a power source into AC power and supply the AC power to an electrical unit, a conversion unit configured to obtain a current or voltage signal supplied to the electrical unit and convert the signal from an analog format to a digital format, a calculation unit configured to calculate a duty command value for performing a pulse width modulation (PWM) control for the electrical unit on the basis of the signal converted by the conversion unit, and a dead time compensating unit configured to provide a PWM signal with a dead time in which the pair of switching elements are in a non-conduction state simultaneously, and compensate the duty command value on the basis of the dead time, the control method comprising the steps of:

determining whether a carrier signal for the PWM control is increasing or decreasing;

correcting a duty command value compensated by the dead time compensating unit on the basis of whether the carrier signal is increasing or decreasing determined in said determining so as to adjust a switching timing of a switching element;

generating a PWM signal on the basis of the duty command value corrected in said correcting and the carrier signal; and controlling the AC power supplied to the electrical unit by switching a connection state of the switching element on the basis of the generated PWM signal.

* * * * *